US011651784B2

(12) United States Patent
Herdendorf et al.

(10) Patent No.: US 11,651,784 B2
(45) Date of Patent: *May 16, 2023

(54) ACTUATORS FOR AN ELEVATOR DRIVE

(71) Applicant: Seagate Technology LLC, Fremont, CA (US)

(72) Inventors: Brett R. Herdendorf, Mound, MN (US); Riyan A. Mendonsa, Edina, MN (US); Wolfgang Rosner, Burnsville, MN (US); Jonathan Lewis Kemnitz, Minnetonka, MN (US); Krishnan Subramanian, Shakopee, MN (US); Kurt LeRoy Erickson, Apple Valley, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,274

(22) Filed: Sep. 13, 2021

(65) Prior Publication Data
US 2022/0068300 A1 Mar. 3, 2022

Related U.S. Application Data

(63) Continuation-in-part of application No. 17/010,289, filed on Sep. 2, 2020, now Pat. No. 11,120,834.

(51) Int. Cl.
*G11B 5/48* (2006.01)
*G11B 13/04* (2006.01)

(52) U.S. Cl.
CPC ............ *G11B 5/4813* (2013.01); *G11B 13/04* (2013.01)

(58) Field of Classification Search
None
See application file for complete search history.

(56) References Cited

U.S. PATENT DOCUMENTS

| 3,311,902 A | 3/1967 | Appleton | |
| 3,509,553 A * | 4/1970 | Krijnen | G11B 5/4806 360/98.02 |

(Continued)

FOREIGN PATENT DOCUMENTS

| JP | H03214476 A | 9/1991 | |
| WO | 2020018854 A1 | 1/2020 | |
| WO | WO-2020236222 A1 * | 11/2020 | G11B 5/5543 |

OTHER PUBLICATIONS

Prior Art Database Technical Disclosure, IP.com No. IPCOM000228512D, "Retracting Load/Unload Ramp", https://ip.com/IPCOM/000228512, dated Jun. 14, 2013, 6 pages.

(Continued)

*Primary Examiner* — William J Klimowicz
(74) *Attorney, Agent, or Firm* — Westman, Champlin & Koehler, P.A.

(57) ABSTRACT

A data storage device includes a base, a shaft that extends perpendicular from the base, and a head stack assembly (HSA) having a first end to which a head is coupled and a second end that is movably mounted on the shaft. The data storage device also includes either a first actuator assembly or a second actuator assembly. The first actuator assembly includes a first coil-permanent magnet assembly that rotatably moves the HSA about the shaft, and a second coil-permanent magnet assembly that serves as a first elevator to linearly move the HSA along the shaft. The second actuator assembly includes a third coil-permanent magnet assembly that rotatably moves the HSA about the shaft, and a second elevator that linearly moves the HSA along the shaft and also moves a data storage device ramp in unison with the HSA.

15 Claims, 20 Drawing Sheets

(56) References Cited

U.S. PATENT DOCUMENTS

| | | | |
|---|---|---|---|
| 3,940,794 A | 2/1976 | Griffiths et al. |
| 4,164,767 A | 8/1979 | Gyi et al. |
| 4,208,685 A | 6/1980 | Matla et al. |
| 4,566,087 A | 1/1986 | Kraft |
| 4,742,410 A | 5/1988 | Smith |
| 4,839,756 A | 6/1989 | Chew et al. |
| 4,884,261 A | 11/1989 | Dalziel |
| 4,888,751 A | 12/1989 | Yoshimaru et al. |
| 5,023,737 A | 6/1991 | Yaeger |
| 5,283,705 A | 2/1994 | Iwabunchi |
| 5,293,282 A | 3/1994 | Squires et al. |
| 5,307,224 A | 4/1994 | Minase |
| 5,341,260 A | 8/1994 | Jabbari |
| 5,343,347 A | 8/1994 | Gilovich |
| 5,347,414 A | 9/1994 | Kano |
| 5,459,921 A | 10/1995 | Hudson et al. |
| 5,467,238 A | 11/1995 | Lee et al. |
| 5,550,695 A | 8/1996 | Matsumoto |
| 5,764,437 A | 6/1998 | Meyer et al. |
| 5,831,795 A | 11/1998 | Ma et al. |
| 5,973,886 A | 10/1999 | Khuu |
| 5,973,887 A | 10/1999 | Cameron |
| 5,995,332 A | 11/1999 | Patterson |
| 5,999,351 A | 12/1999 | Albrecht et al. |
| 6,005,747 A | 12/1999 | Gilovich |
| 6,055,134 A | 4/2000 | Boutaghou |
| 6,067,208 A | 5/2000 | Segar |
| 6,081,399 A | 6/2000 | Lee et al. |
| 6,091,576 A | 7/2000 | Eckerd et al. |
| 6,122,130 A | 9/2000 | Boutaghou et al. |
| 6,134,076 A | 10/2000 | Boutaghou et al. |
| 6,157,520 A | 12/2000 | Mangold et al. |
| 6,160,686 A | 12/2000 | Albrecht et al. |
| 6,201,666 B1 | 3/2001 | Resh |
| 6,275,356 B1 | 8/2001 | Boutaghou et al. |
| 6,278,584 B1 | 8/2001 | Zhang et al. |
| 6,404,580 B1 | 6/2002 | Fioravanti |
| 6,449,129 B1 | 9/2002 | Macpherson et al. |
| 6,452,753 B1 | 9/2002 | Hiller et al. |
| 6,473,270 B1 | 10/2002 | McDonald et al. |
| 6,480,361 B1 | 11/2002 | Patterson |
| 6,487,050 B1 | 11/2002 | Liu |
| 6,490,135 B1 | 12/2002 | Sannino et al. |
| 6,507,460 B2 | 1/2003 | Fayeulle et al. |
| 6,519,115 B1 | 2/2003 | Yaeger |
| 6,577,473 B1 | 6/2003 | Macpherson et al. |
| 6,597,540 B2 | 7/2003 | Tsuda et al. |
| 6,621,651 B1 | 9/2003 | Ratliff et al. |
| 6,650,506 B1 | 11/2003 | Risse |
| 6,693,773 B1 | 2/2004 | Sassine |
| 6,710,964 B1 | 3/2004 | Rao et al. |
| 6,775,107 B2 | 8/2004 | Kasajima et al. |
| 6,847,504 B1 | 1/2005 | Bennett et al. |
| 6,855,282 B2 | 2/2005 | Fayeulle et al. |
| 6,952,319 B2 | 10/2005 | Weiehelt et al. |
| 6,989,965 B2 | 1/2006 | Mundt et al. |
| 7,102,842 B1 | 9/2006 | Howard |
| 7,385,781 B1 | 6/2008 | Craig et al. |
| 7,548,399 B2 | 6/2009 | Shin |
| 7,672,083 B1 | 3/2010 | Yu et al. |
| 7,675,712 B2 | 3/2010 | Liu et al. |
| 7,733,610 B2 | 6/2010 | Scura et al. |
| 7,813,078 B1 | 10/2010 | Gleason et al. |
| 7,848,057 B1 | 12/2010 | Shukla |
| 7,986,491 B2 | 7/2011 | Albrecht et al. |
| 8,024,853 B2 | 9/2011 | Rivera |
| 8,035,913 B2 | 10/2011 | Kim et al. |
| 8,112,580 B2 | 2/2012 | Bandic et al. |
| 8,194,345 B2 | 6/2012 | Kwon et al. |
| 8,208,215 B2 | 6/2012 | Molaro et al. |
| 8,493,690 B1 | 7/2013 | Ono et al. |
| 8,824,094 B1 | 9/2014 | Furlong et al. |
| 8,873,200 B2 | 10/2014 | Warn et al. |
| 8,958,172 B1 | 2/2015 | Hansen |
| 8,958,173 B1 | 2/2015 | Hirano et al. |
| 9,025,277 B1 | 5/2015 | Hirano |
| 9,171,560 B1 | 10/2015 | Davidson et al. |
| 9,183,862 B1 | 11/2015 | Shah et al. |
| 9,218,833 B1 | 12/2015 | Shah et al. |
| 9,449,649 B1 | 9/2016 | Rejae et al. |
| 9,536,552 B1 | 1/2017 | Chen et al. |
| 9,552,835 B1 | 1/2017 | Tamayo et al. |
| 9,704,521 B1 | 7/2017 | Shah et al. |
| 10,269,380 B1 | 4/2019 | Sun et al. |
| 10,622,012 B1 | 4/2020 | Tu et al. |
| 10,706,879 B2 | 7/2020 | Garbarino |
| 10,971,178 B2 | 4/2021 | Garbarino |
| 11,120,834 B1 * | 9/2021 | Herdendorf .............. G11B 5/54 |
| 2005/0280945 A1 | 12/2005 | Duvall et al. |
| 2005/0286171 A1 | 12/2005 | Kim et al. |
| 2006/0002028 A1 | 1/2006 | Nayar et al. |
| 2006/0117558 A1 | 6/2006 | Koh et al. |
| 2006/0171078 A1 | 8/2006 | Kajitani |
| 2006/0256478 A1 | 11/2006 | Hayakawa |
| 2009/0279199 A1 | 11/2009 | Zhang |
| 2010/0091408 A1 * | 4/2010 | Albrecht .............. G11B 17/021 360/110 |
| 2010/0205623 A1 * | 8/2010 | Molaro ................ G11B 17/021 |
| 2011/0038074 A1 | 2/2011 | Viskochil et al. |
| 2012/0002328 A1 | 1/2012 | Aoki et al. |
| 2012/0075750 A1 | 3/2012 | Chan et al. |
| 2014/0126084 A1 | 5/2014 | Nakamiya et al. |
| 2019/0147909 A1 * | 5/2019 | Sun ..................... G11B 5/4813 360/98.02 |
| 2019/0333533 A1 * | 10/2019 | Mendonsa ........... G11B 5/4826 |
| 2020/0027477 A1 | 1/2020 | Garbarino |
| 2020/0027479 A1 | 1/2020 | Myers et al. |
| 2020/0027480 A1 | 1/2020 | Myers et al. |
| 2020/0202891 A1 | 6/2020 | Mendonsa et al. |
| 2020/0302959 A1 | 9/2020 | Garbarino |
| 2020/0381016 A1 | 12/2020 | Liu et al. |
| 2021/0012797 A1 | 1/2021 | Nguyen et al. |
| 2021/0020194 A1 | 1/2021 | Nguyen et al. |

OTHER PUBLICATIONS

Maplesoft Application Brief, "Optimal Control Design of a Voice Coil Head Actuator in a Hard Drive", www.maplesoft.com/appsbriefs, dated 2008, 30 pages.

World's first commercial Hard Drive—IBM 350 (RAMAC); https://www.youtube.com/watch?v=aTkL4FQL2FI; Nov. 27, 2016; 5 pages.

U.S. Appl. No. 16/863,287, filed Apr. 30, 2020, 22 pages.

Restriction Requirement for U.S. Appl. No. 15/946,859, dated May 19, 2020, 8 pages.

Final Office Action for U.S. Appl. No. 15/965,097, dated Mar. 11, 2020, 8 pages.

Notice of Allowance for U.S. Appl. No. 15/965,097, dated May 20, 2020, 6 pages.

Non-Final Office Action for U.S. Appl. No. 15/965,097, dated Jul. 13, 2020, 6 pages.

Application and Drawings for U.S. Appl. No. 16/805,174, dated Feb. 28, 2020, 40 pages.

Non-Final Office Action for U.S. Appl. No. 15/965,097, dated Nov. 21, 2019, 7 pages.

Non-Final Office Action for U.S. Appl. No. 15/965,097, dated Apr. 12, 2019, 7 pages.

Application and Drawings for U.S. Appl. No. 16/910,593, filed Jun. 24, 2020, 29 pages.

Non-Final Office Action for U.S. Appl. No. 17/010,289, dated Feb. 3, 2021, 12 pages.

Notice of Allowance and Examiner Initiated Interview Summary for U.S. Appl. No. 17/010,289, dated May 12, 2021, 12 pages.

\* cited by examiner

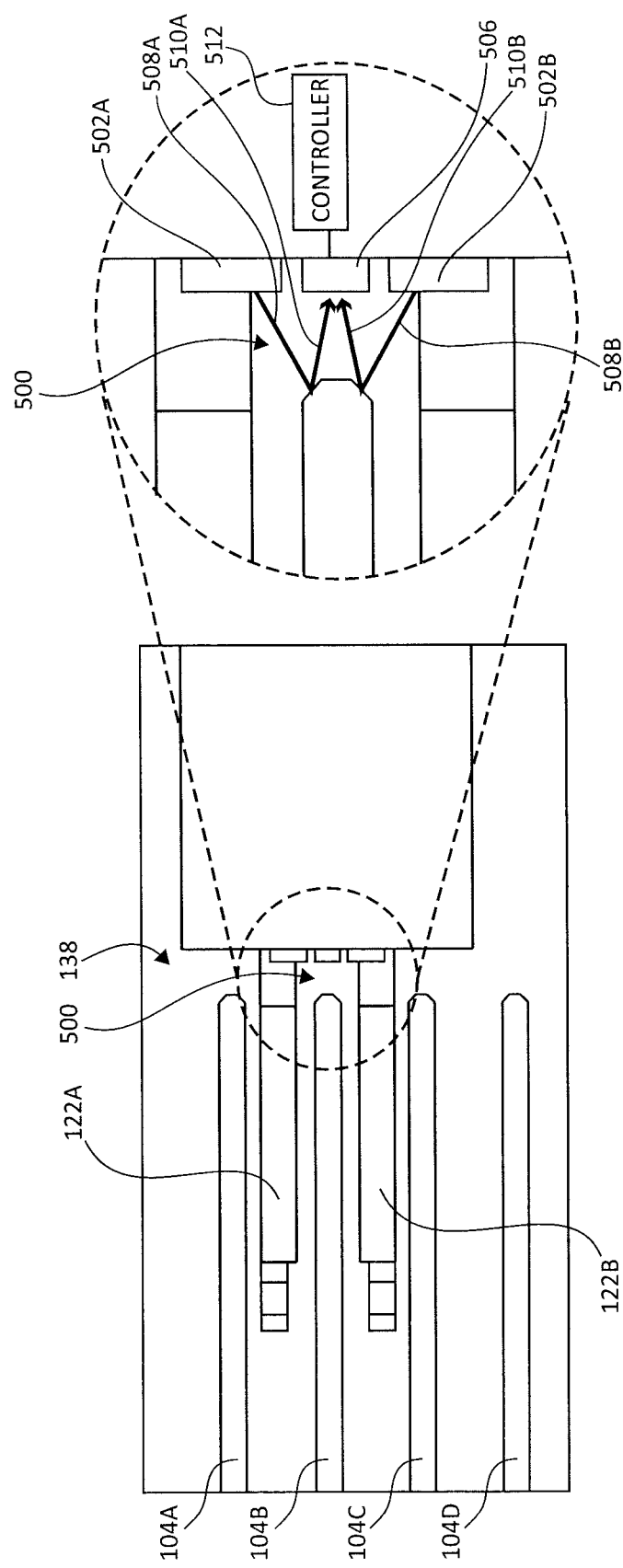

ACTUATORS FOR AN ELEVATOR DRIVE

CROSS-REFERENCE TO RELATED APPLICATION(S)

This application is a continuation-in-part of U.S. application Ser. No. 17/010,289, filed on Sep. 2, 2020, which is scheduled to issue as U.S. Pat. No. 11,120,834, on Sep. 14, 2021, the content of which is hereby incorporated by reference in its entirety.

SUMMARY

In one embodiment, a data storage device is provided. The data storage device includes a base and a shaft having an end coupled to the base. The shaft extends perpendicular from the base. The data storage device also includes a head stack assembly (HSA) having a first end to which a head is coupled and a second end that is movably mounted on the shaft. The data storage device further includes either a first actuator assembly or a second actuator assembly. The first actuator assembly includes a first coil-permanent magnet assembly that rotatably moves the HSA about the shaft, and a second coil-permanent magnet assembly that serves as a first elevator to linearly move the HSA along the shaft. The second actuator assembly includes a third coil-permanent magnet assembly that rotatably moves the HSA about the shaft, and a second elevator that linearly moves the HSA along the shaft and also moves a ramp of the data storage device in unison with the HSA.

In another embodiment, a data storage device is provided. The data storage device includes a base and a shaft having an end coupled to the base. The shaft extends perpendicular from the base. The data storage device also includes a head stack assembly (HSA) having a first actuator arm to which a first head is coupled and a second actuator arm to which a second head is coupled, the first head and the second head being at a first end of the HSA, and a second end of the HSA being movably mounted on the shaft. The data storage device further includes a data storage medium with which the first and second heads are configured to interact. An elevator moves the HSA along the shaft to position the HSA proximate to the data storage medium. An optical feedback system that comprises at least on optical transmitter and at least one optical receiver is also included. At least a portion of the optical feedback system is coupled to the first actuator arm and the second actuator arm such that optical signals transmitted by the at least one optical transmitter are received by the at least one optical receiver when the elevator positions the first actuator arm and the second actuator arm at a predetermined location relative to the data storage medium.

In yet another embodiment, a method of forming an elevator data storage device is provided. The method includes providing a base, and coupling an end of a shaft to the base such that the shaft extends perpendicular from the base. The method also includes providing an HSA having a first end to which a head is coupled and a second end that is movably mounted on the shaft. The method also includes providing one of a first actuator assembly or a second actuator assembly. The first actuator assembly includes a first coil-permanent magnet assembly that rotatably moves the HSA about the shaft, and a second coil-permanent magnet assembly that serves as a first elevator to linearly move the HSA along the shaft. The second actuator assembly includes a third coil-permanent magnet assembly that rotatably moves the HSA about the shaft, and a second elevator that linearly moves the HSA along the shaft and also move a ramp of the data storage device in unison with the HSA.

Other features and benefits that characterize embodiments of the disclosure will be apparent upon reading the following detailed description and review of the associated drawings.

BRIEF DESCRIPTION OF THE DRAWINGS

FIG. 5A-5L illustrate optical feedback systems for positioning an elevators and actuator arms in accordance with one embodiments of the disclosure.

DETAILED DESCRIPTION OF ILLUSTRATIVE EMBODIMENTS

In current hard disc drives (HDDs), a number of heads is equal to a number of disc surfaces, and the heads are rotated for positioning over their corresponding disc surfaces to carry out read/write operations. There is no up/down movement of the heads in such HDDs. However, in an "elevator" drive, the number of heads employed is less than the number of disc surfaces, and a head stack assembly (HSA) including the fewer number of heads is moved up/down to enable a same head to read from multiple disc surfaces.

Embodiments of the disclosure, which are described below, related to actuators for moving HSAs in elevator drives. Prior to providing a detailed description of the different embodiments, one example of an elevator drive is described below in connection with FIG. 1.

Figure 1:
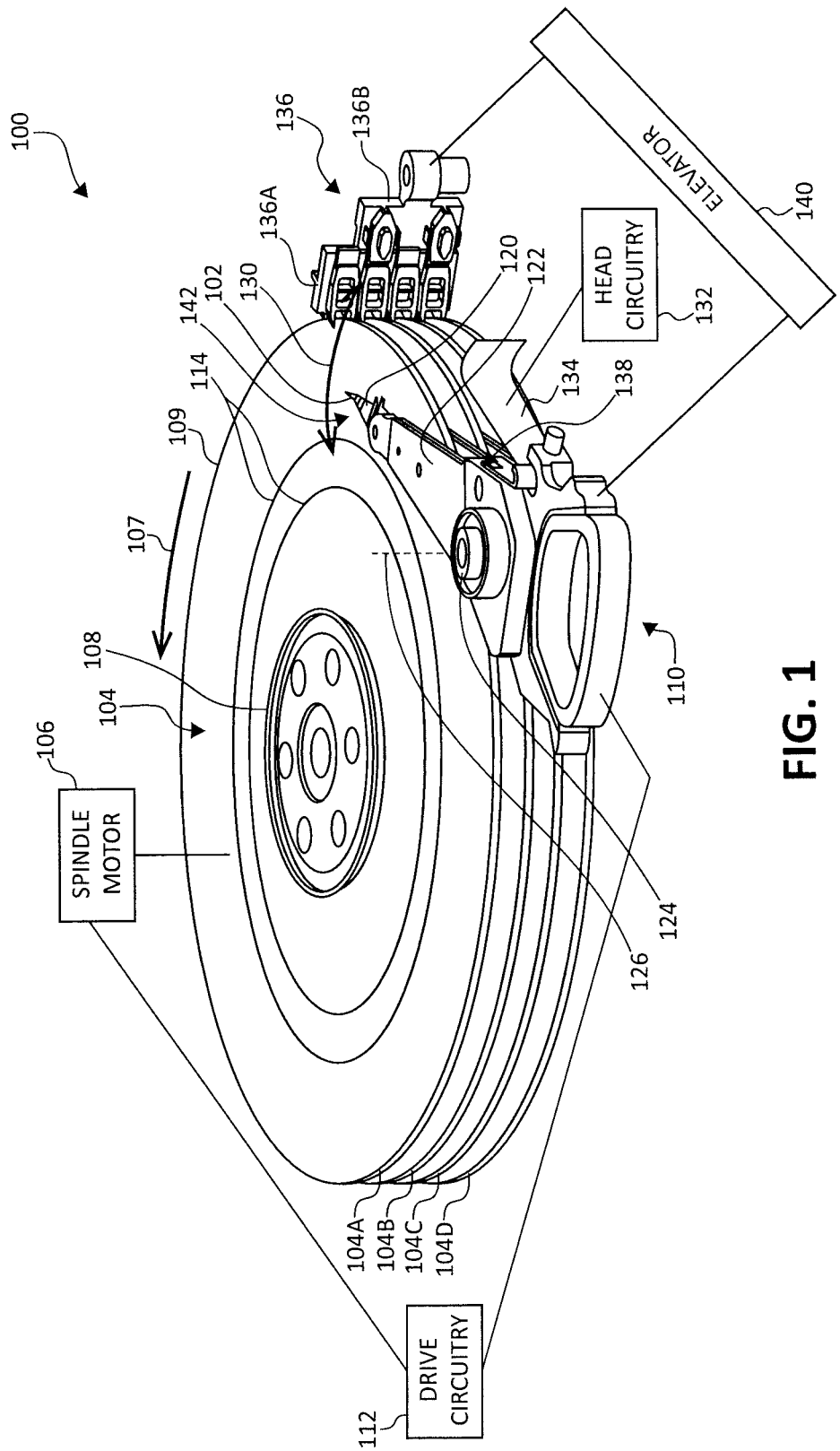
FIG. 1 is a schematic illustration of a data storage device including data storage media, a head stack assembly (HSA) including heads for reading data from and/or writing data to the data storage media, a split ramp for supporting the heads, and an elevator for moving the HSA and a portion of the split ramp in accordance with one embodiment.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1.

Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including data storage media, a head stack assembly (HSA) including heads for reading data from and/or writing data to the data storage media, a split ramp for supporting the heads, and an elevator for moving the HSA and a portion of the split ramp in accordance with one embodiment. In data storage device 100, heads 102 may be positioned over storage media 104 to read data from and/or write data to the data storage media 104. In the embodiment shown in FIG. 1, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism 110 positions the heads 102 relative to data tracks 114 on the rotating media 104 between an inner diameter (ID) 108 and an outer diameter (OD) 109. Both the spindle motor 106 and actuator mechanism 110 are connected to and operated through drive circuitry 112 (schematically shown). Each of heads 102 is coupled to the actuator mechanism 110 through a suspension assembly which includes a load beam 120 connected to an actuator arm 122 of the mechanism 110 for example through a swage connection. The actuator mechanism 110 is rotationally coupled to a frame or deck (not shown) through a bearing 124 to rotate about axis or shaft 126. Rotation of the actuator mechanism 110 moves the heads 102 in a cross-track direction as illustrated by arrow 130. Each of the heads 102 includes one or more transducer elements (not shown) coupled to head circuitry 132 through flex circuit 134.

In general, in order to keep read/write heads 102 from landing on discs 104 in data storage device 100 when, for example, power is removed from the data storage device 100, and to prevent the heads 102 from colliding with outer edges of the discs 104 during load and unload operations, a head-support ramp 136 is provided adjacent to the OD 109 of the discs 104. In data storage device 100, a number of heads 102 is less than a number of disc 104 surfaces. In the particular embodiment shown in FIG. 1, data storage device 100 includes 4 discs, with a total of 8 data storage surfaces, and 4 heads 102. As noted above, each of the 4 heads 102 is coupled to the actuator mechanism 110 through a suspension assembly which includes a load beam 120 connected to an actuator arm 122. The load beams 120 and the actuator arms 122 are collectively referred to as the HSA, which can include one or more heads 102.

In data storage device 100 of FIG. 1, the HSA, which is denoted by reference numeral 138, may be moved along axis 126 between an upper position and a lower position with the help of an elevator 140, which is schematically shown in FIG. 1. In the upper position shown in FIG. 1, the 4 heads interact with data storage surfaces of discs 104A and 104B. In the lower position (not shown), the same 4 heads interact with data storage surfaces of discs 104C and 104D.

In order to enable the up/down movement of the HSA 138, head-support ramp 136 is designed as a split ramp with a stationary portion 136A and movable portion 136B. In order to move the HSA 138 from either the upper position to the lower position or from the lower position to the upper position, the HSA 138 is first rotated about axis 126 until a head end 142 of the HSA 138 is supported on the movable portion 136B of the head-support ramp 136. Then, the HSA 138 and the movable portion 136B are moved up/down in unison by the elevator 140. It should be noted that, in some embodiments, ramp 136 may be a single unit that can be retracted away from the discs 104 to enable up/down movement of the HSA 138 and the entire ramp 136 by the elevator 140. Details regarding one embodiment of elevator 140 are provided below in connection with FIG. 2A.

Figure 2A:
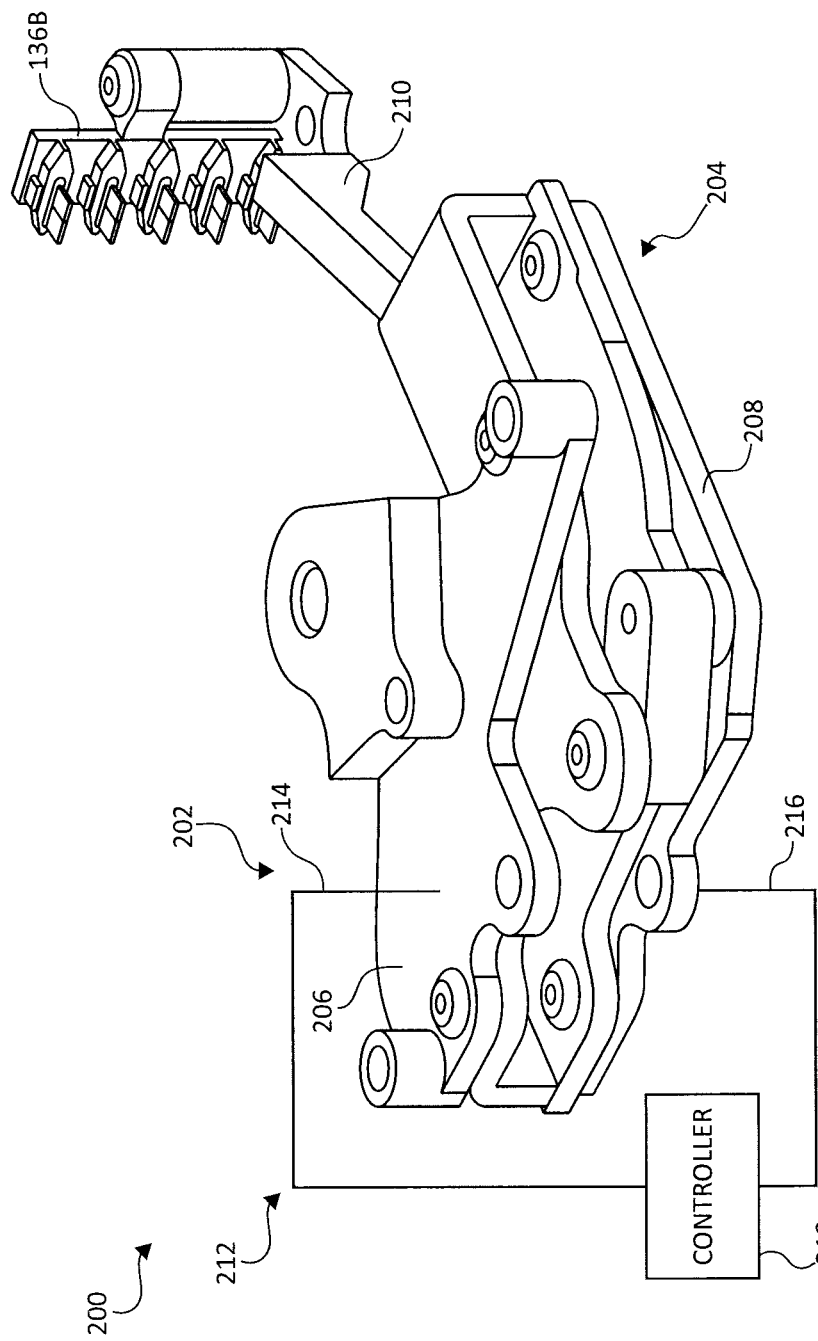
FIG. 2A is a perspective view of an embodiment of an elevator for simultaneously moving a ramp portion and an HSA.

FIG. 2A illustrates an elevator 200 in accordance with one embodiment. Elevator 200 includes an upper portion 202 and a lower portion 204. In one embodiment, upper portion 204 includes a first plate 206 and lower portion 204 includes a second plate 208. A ramp arm 210 extends from (or is coupled to) second plate 208. As can be seen in FIG. 2A, movable ramp portion 136B is coupled to a ramp arm or actuator 210. Elevator 200 includes a drive mechanism 212 that moves first plate 206, second plate 208 and ramp arm or actuator 210 up and down. In the embodiment of FIG. 2A, shape memory alloy (SMA) wires are employed to carry out the up and down movement. In general, a SMA wire may be in an expanded sate at room temperature (e.g., between about 15 degrees Celsius (° C.) and about 25° C.). To cause the SMA wire to contract, an electrical current may be supplied to the SMA wire to heat the wire. The heating of the wire above room temperature causes the wire to contract. It should be noted that SMA wires are only one example of a movement-causing mechanism and other suitable movement-causing mechanisms may be used in other embodiments.

As can be seen in FIG. 2A, a first end of a first SMA wire 214 is coupled to first plate 206, and a first end of a second SMA wire (or wires) 216 is coupled to second plate 208, Second ends of SMA wires 214 and 216 are connected to a control circuit or controller chip (referred to herein as a controller) 218, To move first plate 206, second plate 208 and ramp arm or actuator 210 up, controller 218 supplies power (e.g., current) to first SMA wire 214, which responsively contracts as a result of a temperature rise caused by the current. The contraction of first SMA wire 214 lifts first plate 206, second plate 208 and ramp arm 210 up. It should be noted the upper portion 202 and lower portion 204 of elevator may be directly or indirectly coupled to each other using any suitable mechanism (e.g., suitable fasteners) and therefore, although first SMA wire 214 is connected to first plate 206, second plate 208 and ramp arm 210 also move when first SMA wire 214 contracts. For downward movement, power to first SMA wire 214 is terminated, and controller 218 supplies power (e.g., current) to second SMA wire 216, which responsively contracts as a result of a temperature rise caused by the current. The contraction of second SMA wire 214 pulls first plate 206 second plate 208 and ramp arm 210 down. How up/down movement of elevator 200 causes corresponding up/down movement of HSA 138 and moveable ramp portion 136B is described below in connection with FIGS. 2B and 2C.

Figure 2B:
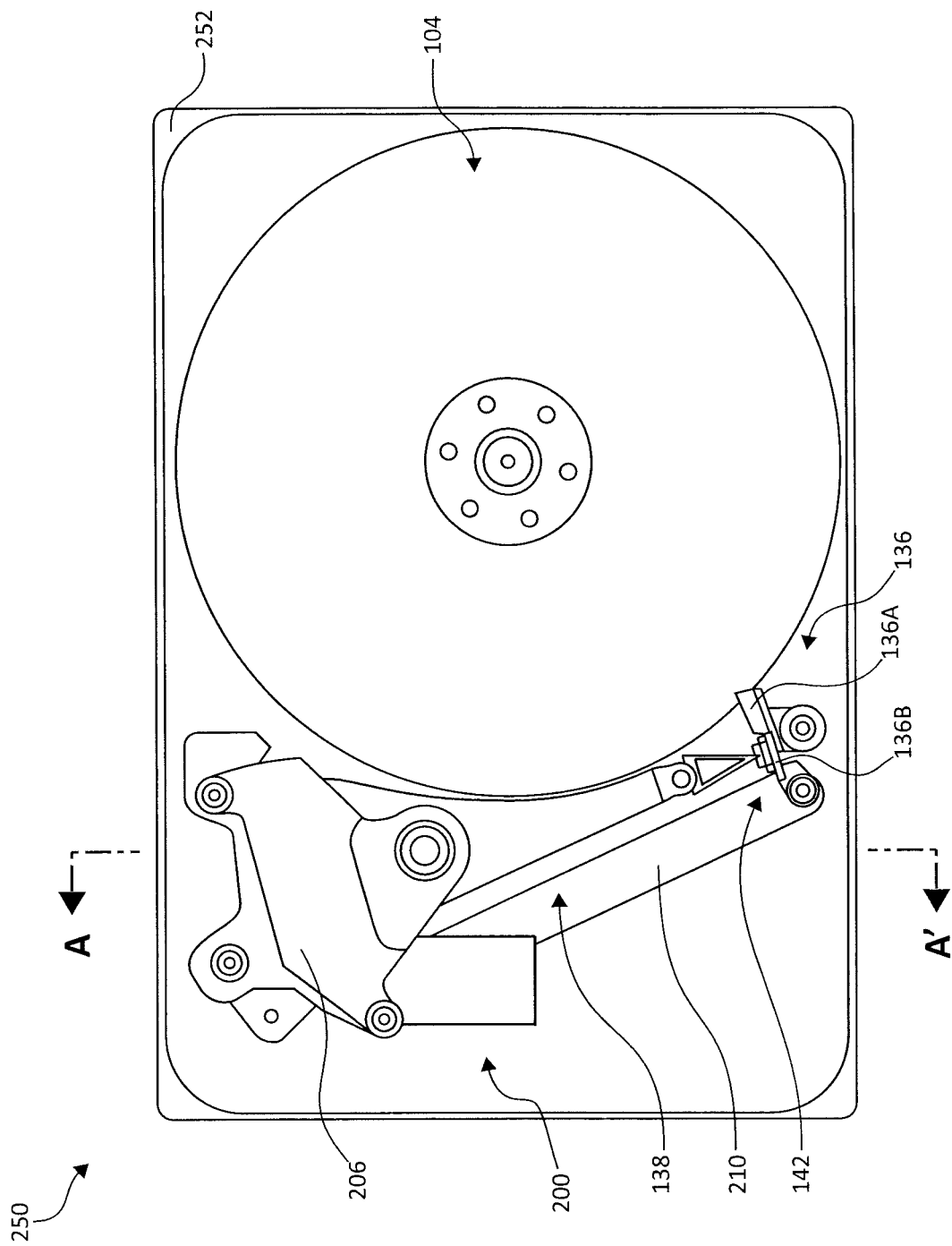
FIG. 2B is a top view of a data storage device including the elevator of FIG. 2A.

FIG. 2B is a top view of a data storage device 250 including elevator 200 of FIG. 2A. Since the elements of data storage device 250 are substantially similar to those of data storage device 100, and since elevator 200 is described above in connection with FIG. 2A, a description of the similar/same elements is not provided in connection with FIG. 2B. In the top view of FIG. 2B, the top cover of data storage device 250 is left out to show the different elements arranged within base-deck 252 of the data storage device 250. Base-deck 252 includes a four-sided frame and a floor or base to which the shaft 126 is coupled such that it extends vertically (or substantially perpendicular) to the base. As can be seen in FIG. 2B, head end or first end 142 of the HSA 138 is supported on the movable portion 136B of the head-support ramp 136. In this position, elevator 200 can move the HSA 138 and the movable ramp portion 136B in unison. Elements of HSA 138 located between first elevator plate 206 and second elevator plate 208 (not shown in FIG. 2B) that enable, for example, rotary movement of HSA 138 are described below in connection with FIG. 2C.

Figure 2C:
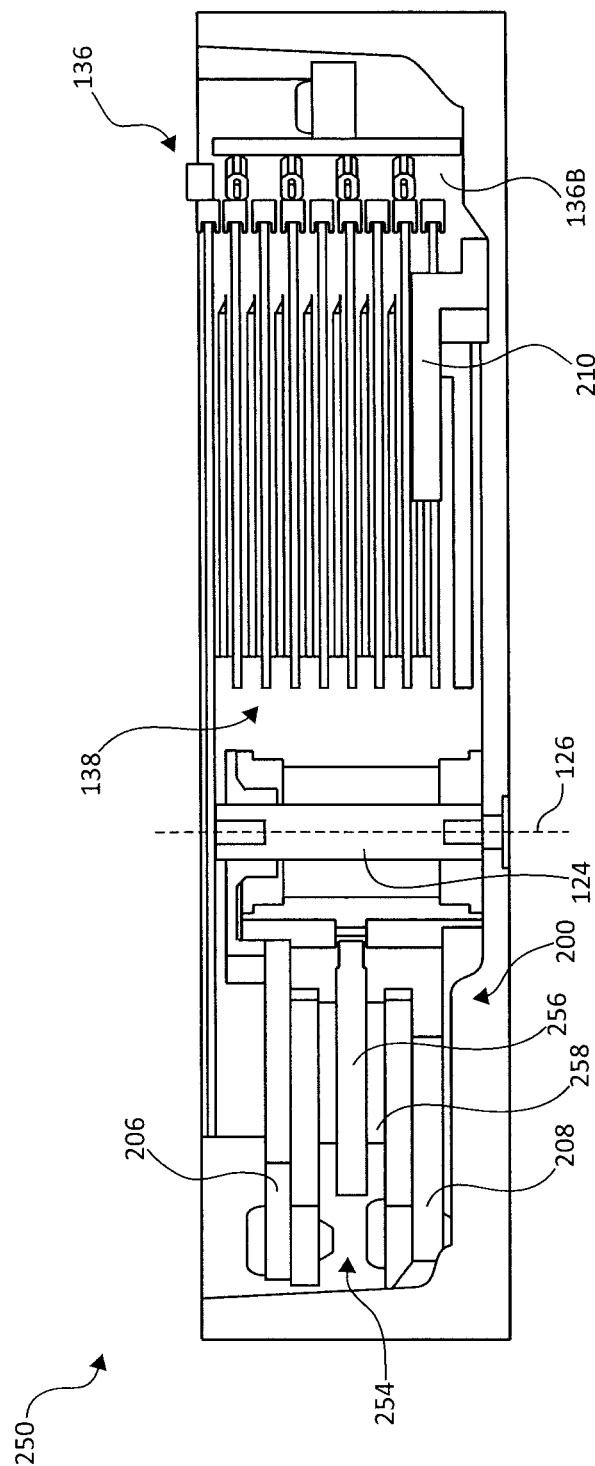
FIG. 2C is a cross-sectional view of the data storage device of FIG. 2B.

FIG. 2C is a cross-sectional view of data storage device 250 of FIG. 2B along line A-A' shown in FIG. 2B. A coil-permanent magnet assembly (e.g., a voice coil motor (VCM)) 254 is coupled to HSA 138 and included between first elevator plate 206 and second elevator plate 208. In the embodiments of FIG. 2C, a rotary-movement-enabling coil (e.g., a VCM 254 coil) 256 is coupled to HSA 138 and rotary-movement-enabling permanent magnet (e.g., a VCM 254 permanent magnet) 258 is located between first elevator plate 206 and second elevator plate 208 proximate to VCM coil 256. In an alternate embodiment, VCM magnet 258 may be coupled to the HSA 138 and VCM coil 256 may be positioned between first elevator plate 206 and second elevator plate 208 proximate to VCM magnet 258. Bearing 124 is a linear rotary bearing that enables both rotary movement of HSA 138 by VCM 254 and linear movement of HSA 138 along axis 126 by elevator 200.

Since a portion of the HSA 138 to which the VCM 254 is coupled is between elevator plates 206 and 208 and other portions of HSA 138 may be coupled to elevator 200, HSA 138 is moved up/down when wires 214/216 (not shown in FIG. 2C) are energized in a manner described above in connection with FIG. 2A. Also, since movable ramp portion 136B is coupled to ramp arm 210, both HSA 138 and movable ramp portion 136B are moved in unison by elevator 200. The coil-permanent magnet assembly (e.g., VCM) 254 and the elevator 200 may collectively referred to as an actuator assembly.

In the above-described embodiment, the actuator assembly includes a coil-permanent magnet assembly for rotary movement of the HSA and an elevator that employs SMA wires for linear (e.g., up/down) movement of the HSA and the movable ramp portion. However, in some embodiments, coil-permanent magnet assemblies may be employed for both rotary movement and linear movement of the HSA. Examples of such embodiments are provided below in connection with FIGS. 3A-3D and 4A-4F.

Figure 3A:
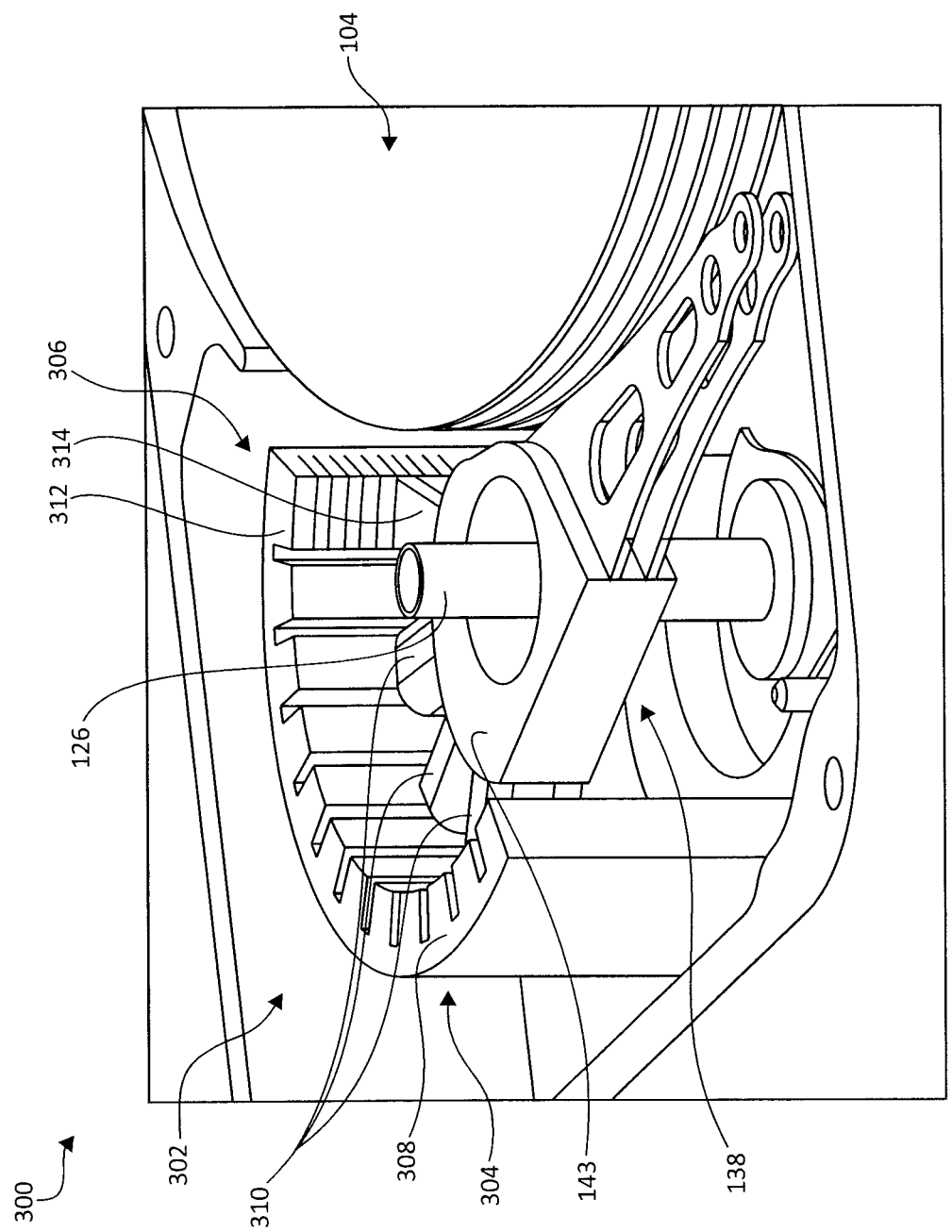
FIG. 3A is a diagrammatic illustration of a data storage device portion having an actuator assembly that includes coil-permanent magnetic assemblies for rotary and linear movement of an HSA in accordance with one embodiment.

FIG. 3A is a diagrammatic illustration of a data storage device portion 300 having an actuator assembly that includes coil-permanent magnetic assemblies for rotary and linear movement of an HSA in accordance with one embodiment. As can be seen in FIG. 3A, HSA 138 is movably mounted on shaft 126. In the interest of simplification, elements of HSA 138 such as load beam 120 and head(s) 102 at first end 142 of HSA 138, which are shown in FIG. 1, are not shown in FIGS. 3A, 3C and 3D. In the embodiment of FIG. 3A, an actuator assembly 302 coupled to second end 143 of HSA 138 includes a first coil-permanent magnet assembly 304 for rotatably moving the HSA 138 and a second coil-permanent magnet assembly 306 for linearly moving the HSA 138 up and down.

The first coil-permanent magnet assembly 304 includes rotary-movement-enabling permanent magnets 308 and rotary-movement-enabling coils 310, which are coupled to second end 143 of the HSA 138 and are arranged side-by-side in an arc. When current is applied to one or more of the rotary-movement-enabling coils 310, the interaction of the magnetic field(s) generated by the rotary-movement-enabling coil(s) 310 with the magnetic field(s) generated by the rotary-movement-enabling permanent magnets 308 causes rotary-movement-enabling coils 310 to move in a direction that is dependent on the current direction, thereby causing HSA 138 to rotate about shaft 126 according to the direction of movement of the rotary-movement-enabling coils 310. Current may be supplied to the rotary-movement-enabling coils 310 by a controller (not shown) that may be electrically coupled to the rotary-movement-enabling coils 310 by electrical connectors (e.g., flex wires), which are not shown.

The second coil-permanent magnet assembly 306 includes linear-movement-enabling permanent magnets 312 and linear-movement-enabling coils 314, which are coupled to second end 143 of the HSA 138 and are stacked one above the other. When current is applied to one or more of the linear-movement-enabling coils 314, the interaction of the magnetic field(s) generated by the linear-movement-enabling coil(s) 314 with the magnetic field(s) generated by the linear-movement-enabling permanent magnets 312 causes linear-movement-enabling coils 314 to move in a direction that is dependent on the current direction, thereby causing HSA 138 to move up/down along shaft 126 according to the direction of movement of the linear-movement-enabling coils 314. As in the case of rotary-movement-enabling coils 310, current may be supplied to the linear-movement-enabling coils 314 by the controller (not shown) that may be electrically coupled to the linear-movement-enabling coils 314 by electrical connectors (e.g., flex wires), which are not shown.

Figure 3B:
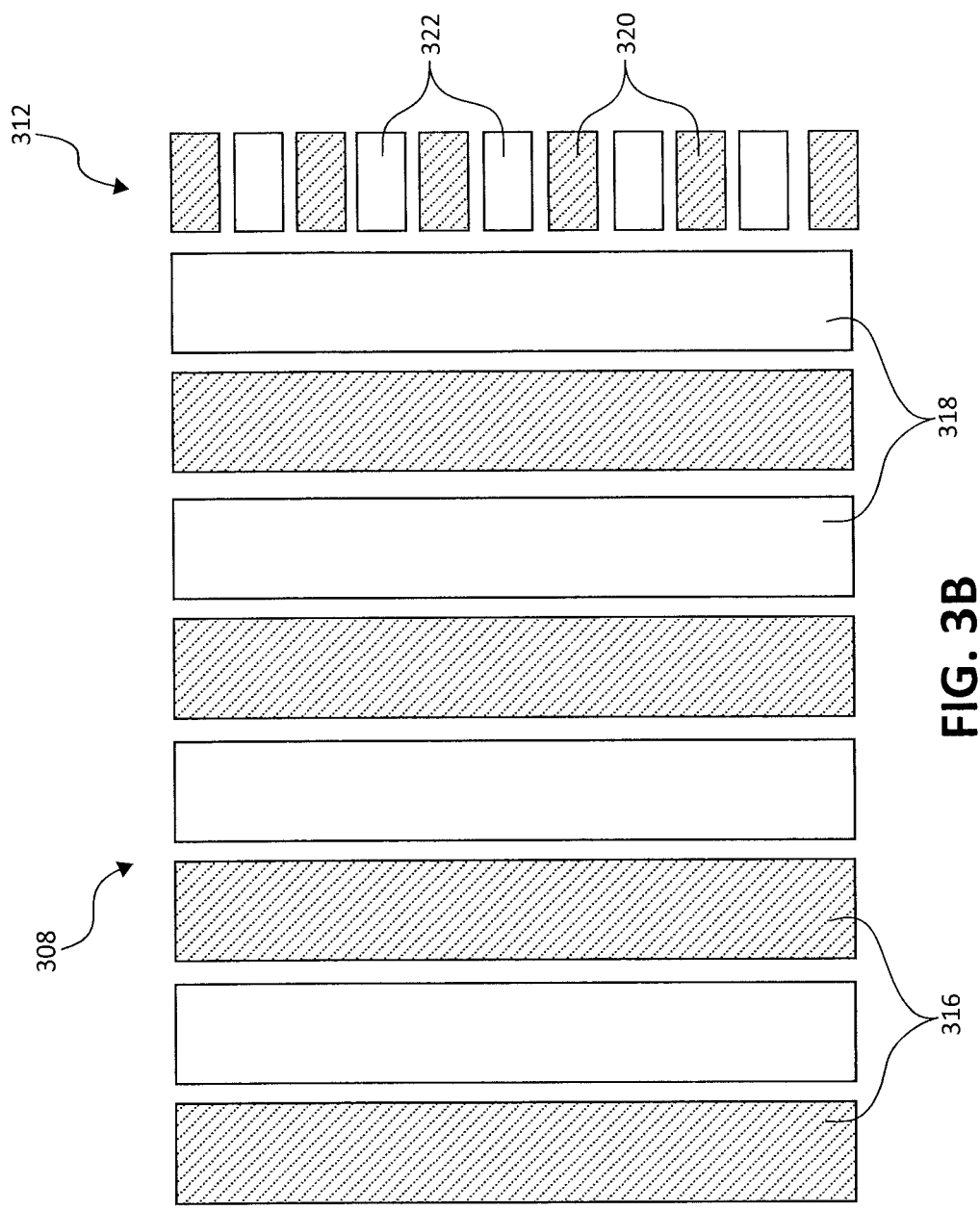
FIG. 3B is a diagrammatic illustration showing a layout of magnetic poles for rotary and linear movement.

FIG. 3B is a diagrammatic illustration showing a layout of magnetic poles for rotary and linear movement. First rotary-movement-enabling poles 316 alternate with second rotary-movement-enabling poles 318. If first rotary-movement-enabling poles 316 are north poles, then second rotarymovement-enabling poles 318 are south poles. Similarly, if first rotary-movement-enabling poles 316 are south poles, then second rotary-movement-enabling poles 318 north poles. First linear-movement-enabling poles 320 alternate with second linear-movement-enabling poles 322 in a similar manner as the rotary-movement-enabling poles 316 and 318, but are stacked one above the other. As can be seen in FIG. 3B, a height of each rotary-movement-enabling pole 316, 318 is equal (or substantially equal) to a height of the entire stack of liner-movement-enabling poles 320 and 322.

Figure 3C:
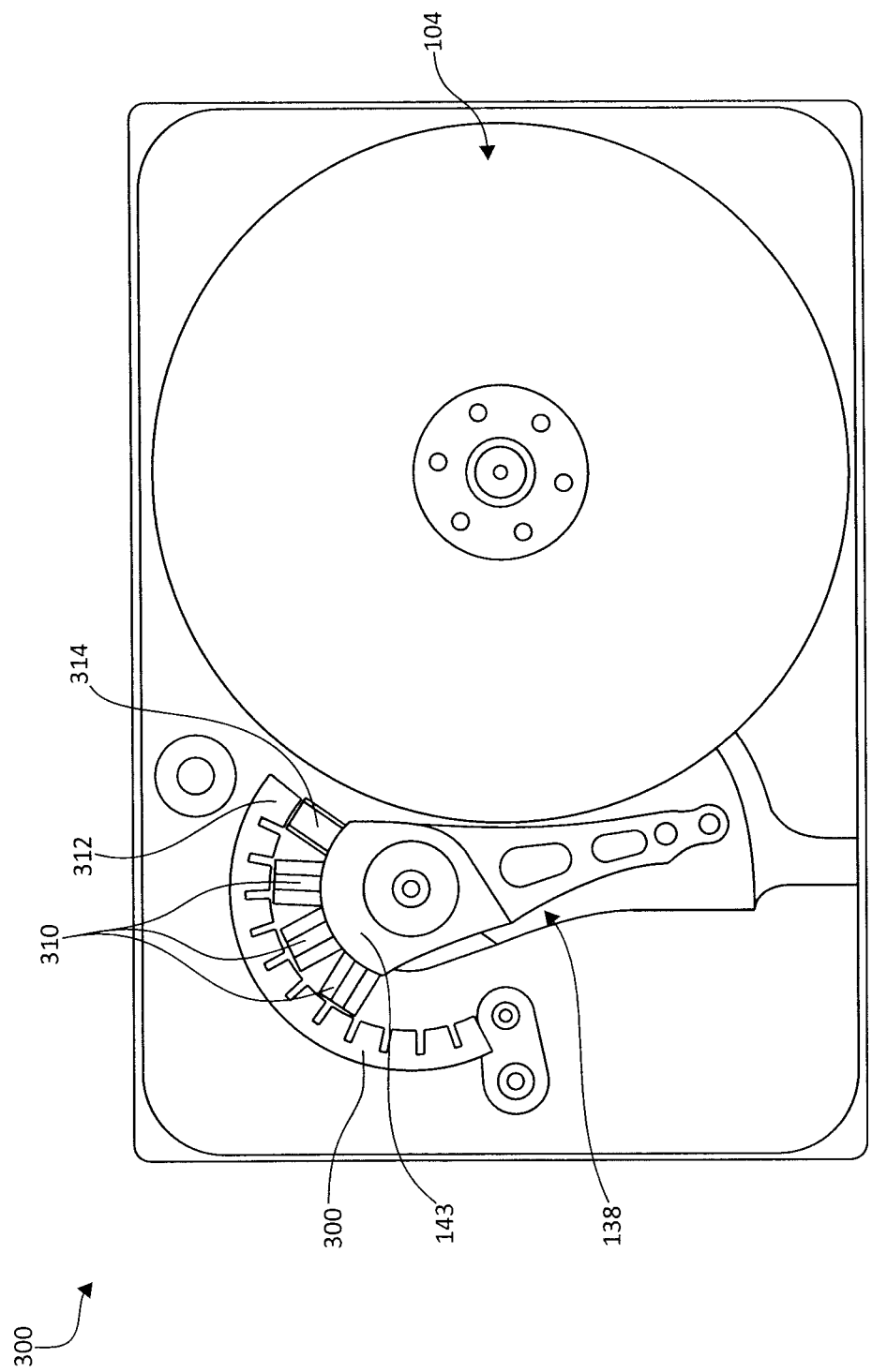
FIG. 3C is a top view of the data storage device of FIG. 3A.
Figure 3D:
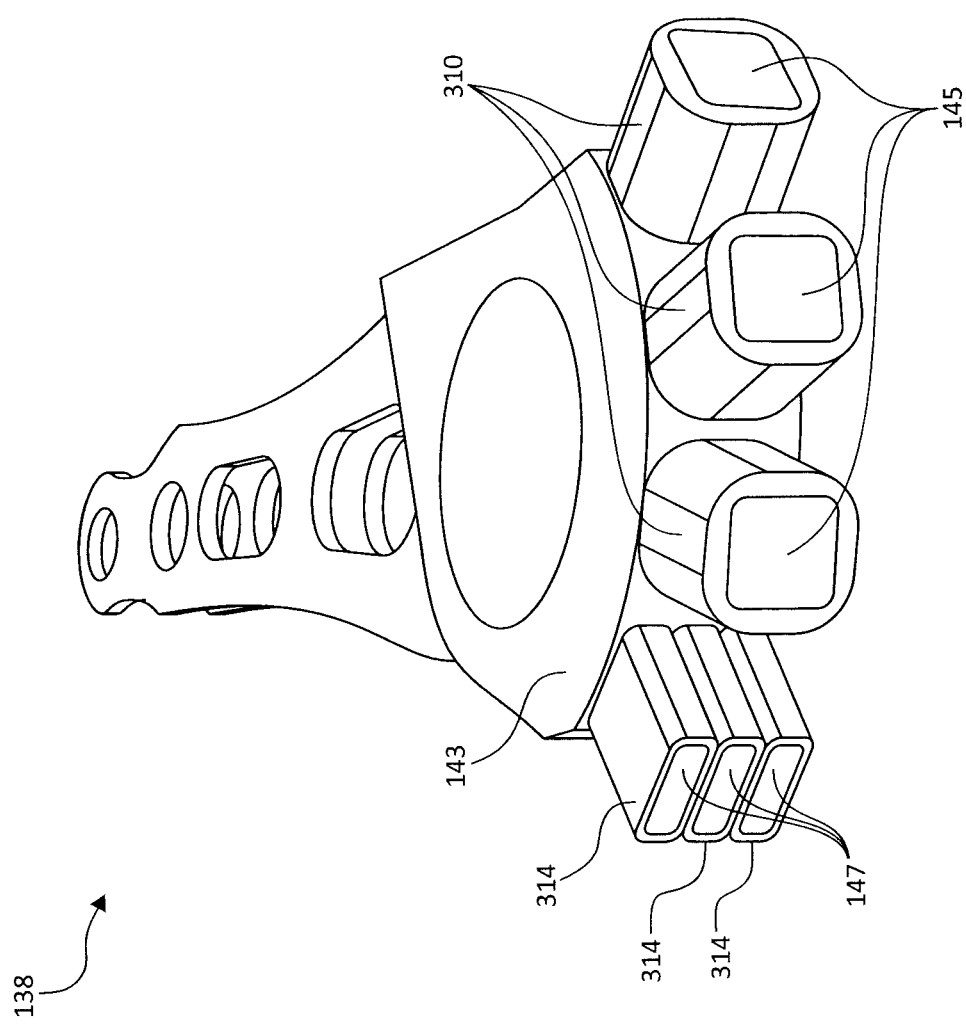
FIG. 3D is a diagrammatic illustration of an HSA showing rotary-movement-enabling coils and linear-movement-enabling coils.

FIG. 3C is a top view of data storage device 300, and FIG. 3D is a diagrammatic illustration of HSA 138 showing rotary-movement-enabling coils 310 and linear-movement-enabling coils 314. In the embodiment shown in FIGS. 3C and 3D, 3 rotary-movement-enabling coils 310 and 3 linear-movement-enabling coils 314 are employed. However, other embodiments, any suitable number of rotary-movement-enabling coils 310 and linear-movement-enabling coils 314 may be employed. Also, the number of rotary-movement-enabling coils 310 may be different from the number of linear-movement-enabling coils 314. In the embodiment of FIG. 3D, wound rotary-movement-enabling coils 310 are mounted on first projections 145 at second end 143 of HSA 138. Similarly, wound linear-movement-enabling coils 314 are mounted on second projections 147 at second end 143 of HSA 138.

FIGS. 4A-4F are diagrammatic illustrations of portions of a data storage device 400A having an actuator assembly 402 that includes coil-permanent magnetic assemblies for rotary and linear movement of an HSA in accordance with another embodiment. The coil-permanent magnet assembly employed to provide linear up/down movement in the embodiments of FIGS. 4A-4F is substantially similar to the second coil-permanent magnet assembly 306 of FIG. 3A and therefore the entire coil-permanent magnet assembly for up/down movement is shown only in FIG. 4D.

Figure 4B:
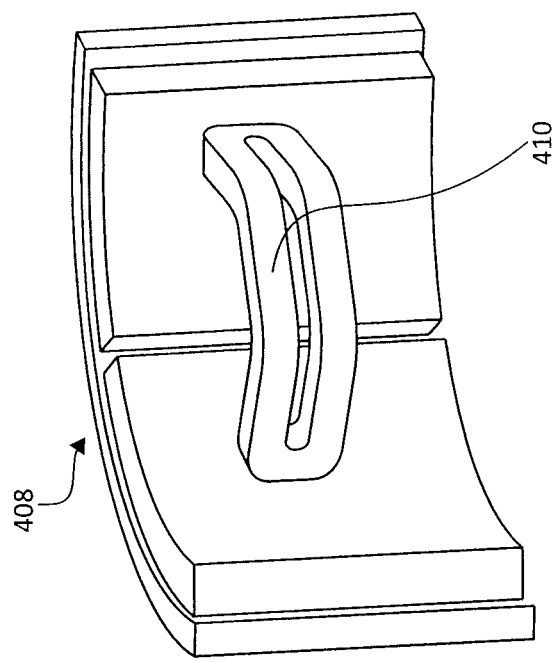
FIGS. 4A-4I are diagrammatic illustrations of portions of a data storage device having an actuator assembly that includes coil-permanent magnetic assemblies for rotary and linear movement of an HSA in accordance with another embodiment.
Figure 4A:
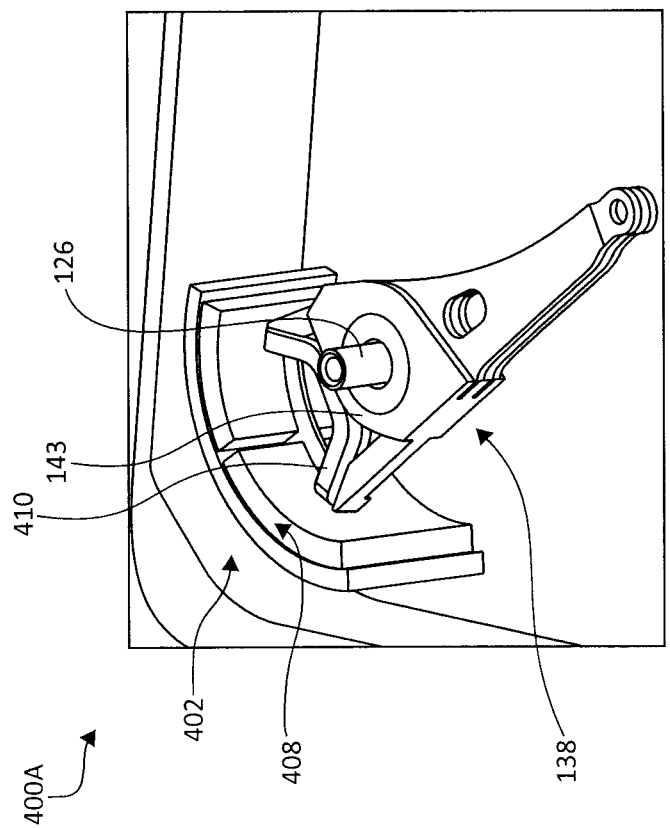
Figure 4C:
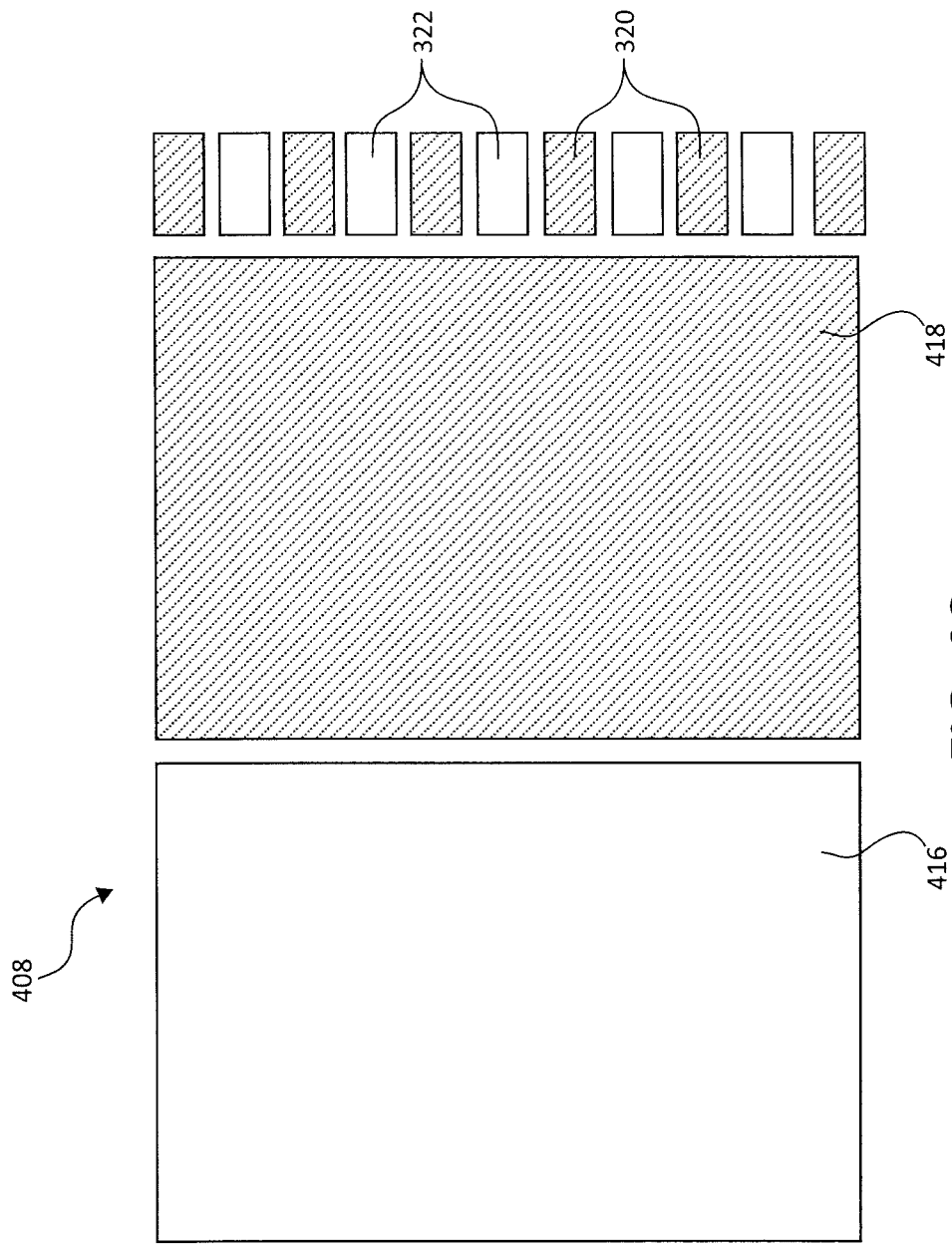
Figure 4D:
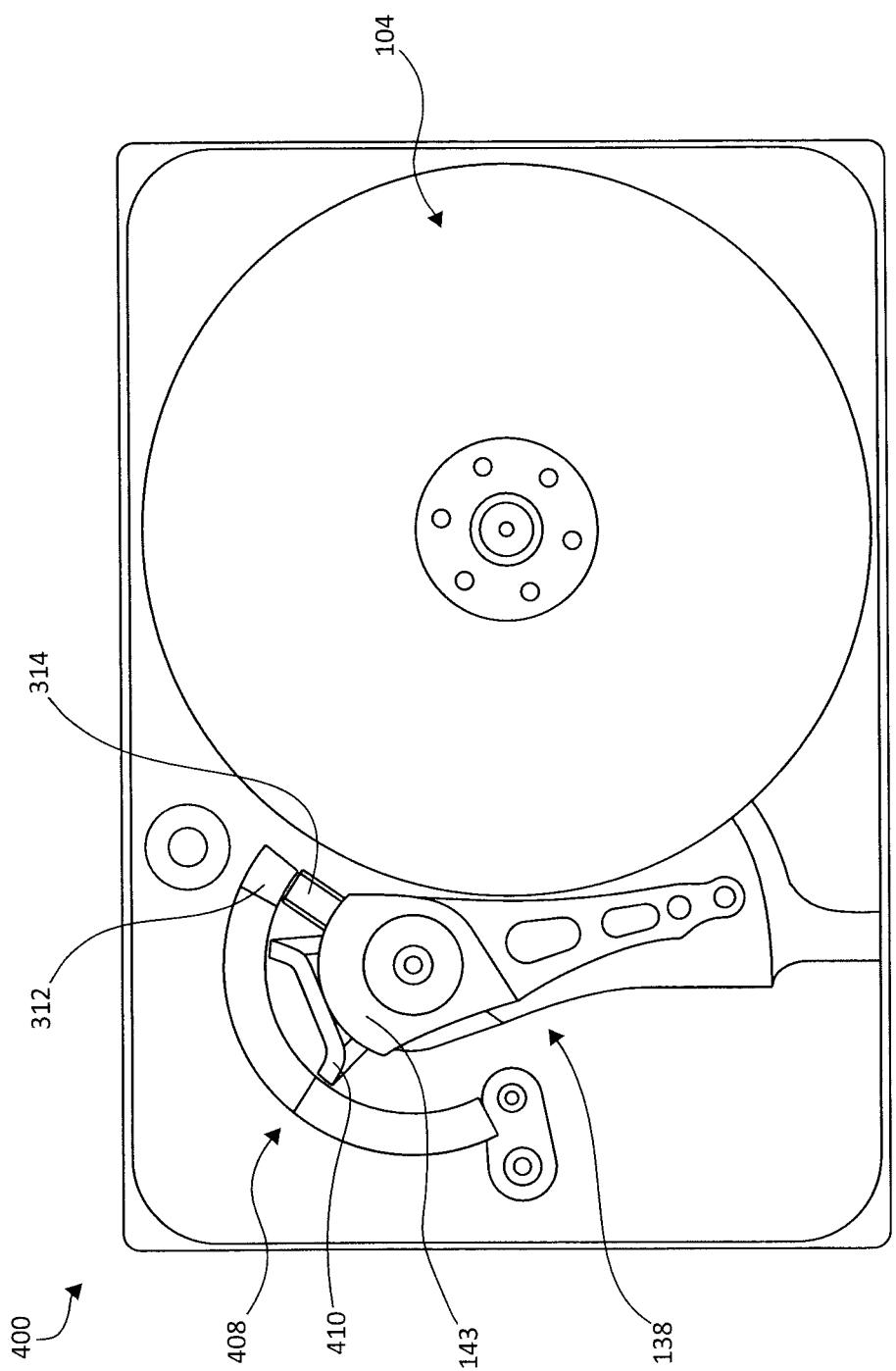
Figure 4F:
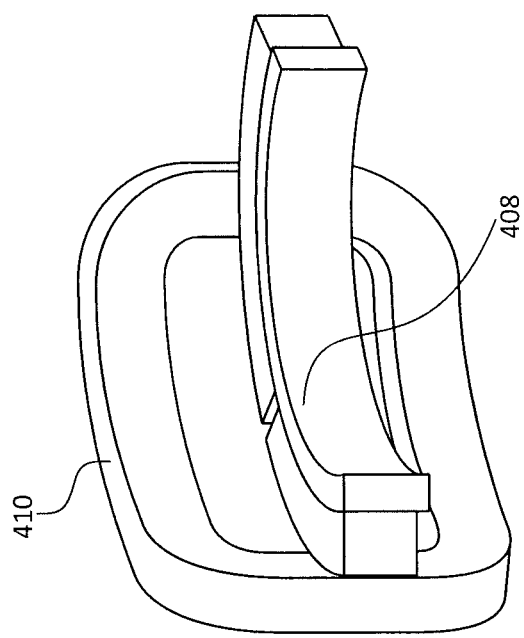
Figure 4E:
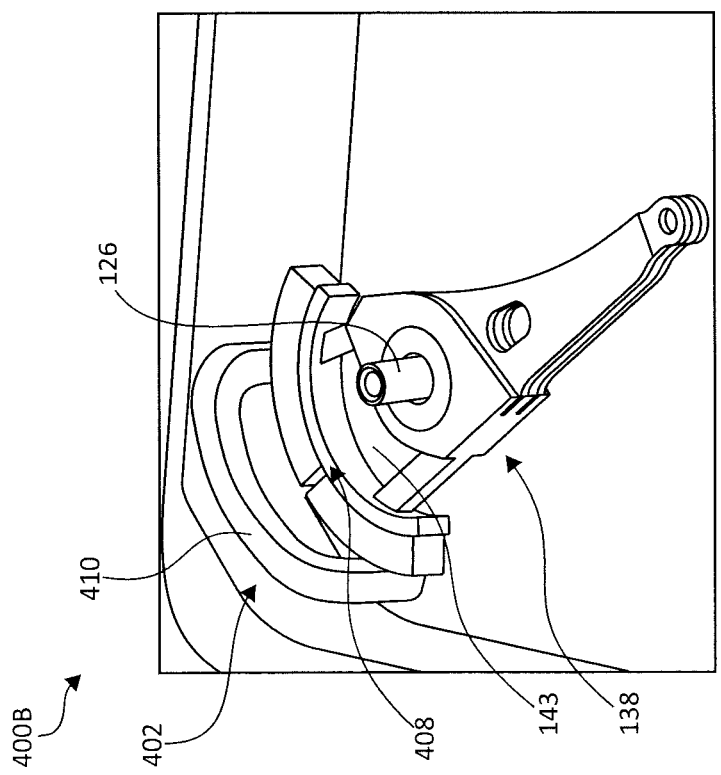
Figure 4I:
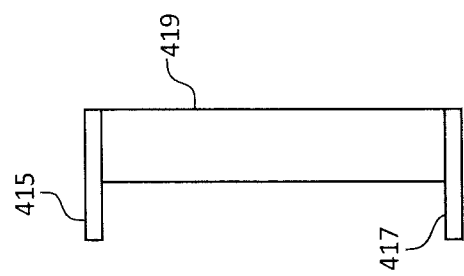
Figure 4H:
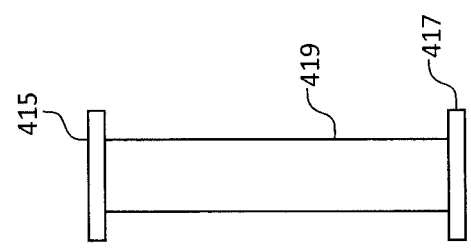
Figure 4G:
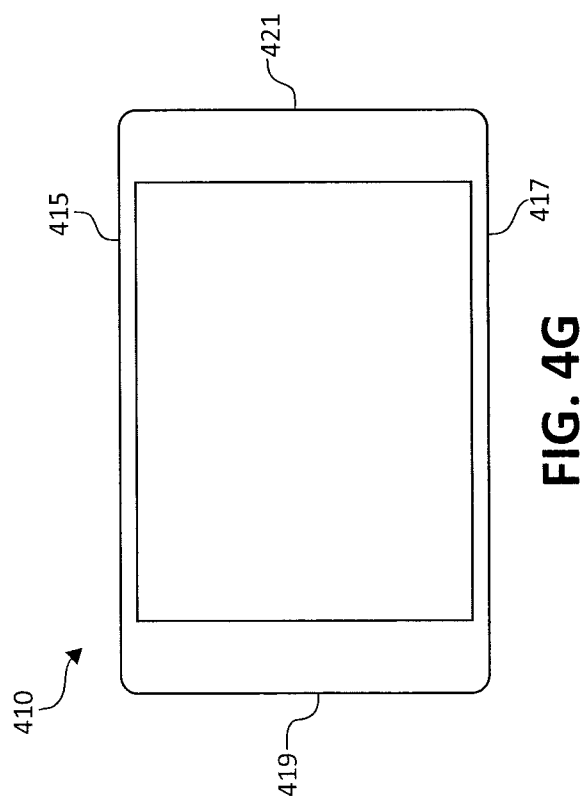

As can be seen in FIGS. 4A and 4B, rotary-movement-enabling coil 410 is a single VCM coil coupled to the second end 143 of HSA 138. When supplied with an electric current in a manner described above in connection with FIGS. 3A-3D, the magnetic field of VCM coil 410 interacts with the magnetic field of VCM magnet 408 to cause rotary movement of HSA 138. FIG. 4C shows first VCM pole 416 and second VCM pole 418 of VCM magnet 408. Also, as indicated above, linear-movement-enabling permanent magnet poles 320 and 322 are shown in FIG. 4C. FIG. 4D shown a top view of the data storage device 400. In FIG. 4A-4D, VCM coil 410 is coupled to the second end 143 of HSA 138. However, in an alternate embodiment shown as data storage device portion 400B in FIGS. 4E and 4F, VCM magnet 408 may be coupled to the second end 143 of HSA 138, and VCM coil 410 may be located proximate to the second end 143 of HSA 138 (near VCM magnet 408). It should be noted that the shape of rotary-movement-enabling coil 410 in FIGS. 4E and 4F may be different in different embodiments. For example, as shown in FIG. 4G, upper portion 415 and lower portion 417 of coil 410 may be flattened to increase a Z-direction (up/down) stroke where the rotary motion can operate. Thus, sides 419 and 421 of the coil 410 may be of a different shape than the upper coil portion 415 and the lower coil portion 417, which are flattened. In some embodiments, the upper coil portion 415 and the lower coil portion 417 may be flattened in a manner shown in FIG. 4H, such that they extend substantially equally over sides 419 and 421. In certain other embodiment, the upper portion 415 and the lower portion 417 may be flattened in a manner shown in FIG. 4I, such that they extend in a backward direction over sides 419 and 421. This may further prevent interference from magnetic fields from the top 415 and bottom 417 portions of the coil 410 that do not contribute towards enabling rotary movement of the coil 410. It should also be noted that, although a single set of magnets 408 are shown, a closed magnetic circuit may also be utilized in some embodiments.

FIGS. 5A and 5B together illustrate an optical feedback system 500 for positioning an elevator in accordance with one embodiment. In the example shown in FIGS. 5A and 5B, the elevator may be second coil-permanent magnet assembly 306 (of FIG. 3A) for linearly moving HSA 138 up and down. In FIG. 5A, two actuator arms 122A and 122B of HSA 138 are shown. In the interest of simplification, load beams (such as 120 of FIG. 1) and heads (such as 102 of FIG. 1) are not shown in FIGS. 5A and 5B.

In the embodiment of FIGS. 5A and 5B, optical feedback system 500 makes use of reflection from one or more discs to determine a position of the elevator. Since first actuator arm 122A and second actuator arm 122B are part of HSA 138, they are moved up/down shaft 126 (not shown in FIGS. 5A and 5B) by the elevator. Optical feedback system 500 includes a first optical transmitter (in general, one or more optical transmitters) 502A that is coupled to (or positioned proximate to) the first actuator arm 122A and a second optical transmitter (in general, one or more optical transmitters) 502B that is coupled to (or positioned proximate to) the second actuator arm 122B. Optical feedback system 500 further includes one or more optical receivers 506 installed between the first actuator arm 122A and the second actuator arm 122B and are positioned such they receive reflected optical signals 510A and 510B, of transmitted signals 508A and 508B of respective first 502A and second 502B optical transmitters, from a disc (e.g., 104B) between the first actuator arm 122A and the second actuator arm 122B. When the two reflected optical signals 510A and 510B are equal or have less that a predetermined difference in strength, the HSA 138 is considered centered on the disc (e.g., 104B) and the elevator is stopped. The determination that the two reflected optical signals 510A and 510B are equal or have less that a predetermined difference in strengths may be made by circuitry in the receiver(s) 506 or by a controller 512 coupled to the receiver(s) 506. In should be noted that element 506 may be single receiver or may be multiple receives with each of the receivers having a different frequency specific to each transmitter 502A, 502B. For an example with four heads which translates to three arms (e.g., one head on a top-most arm of a 3-arm stack, 2 heads on a middle arm of the stack, and one head on a bottom arm of the stack) the sensors could be placed such that the two similar sensors are on the outer two arms (e.g., top-most and bottom-most arms of the 3-arm stack) and the complementary sensor is on the middle arm.

Figure 5D:
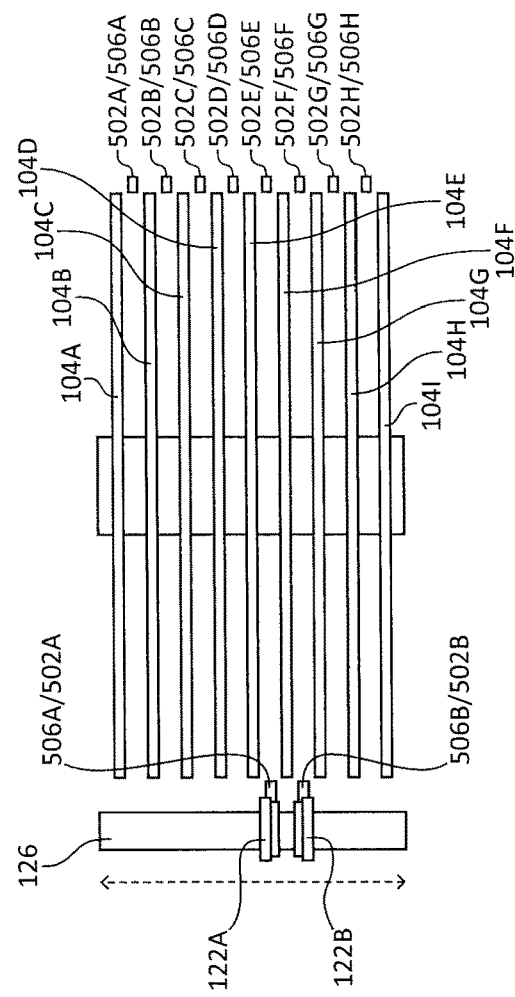
Figure 5C:
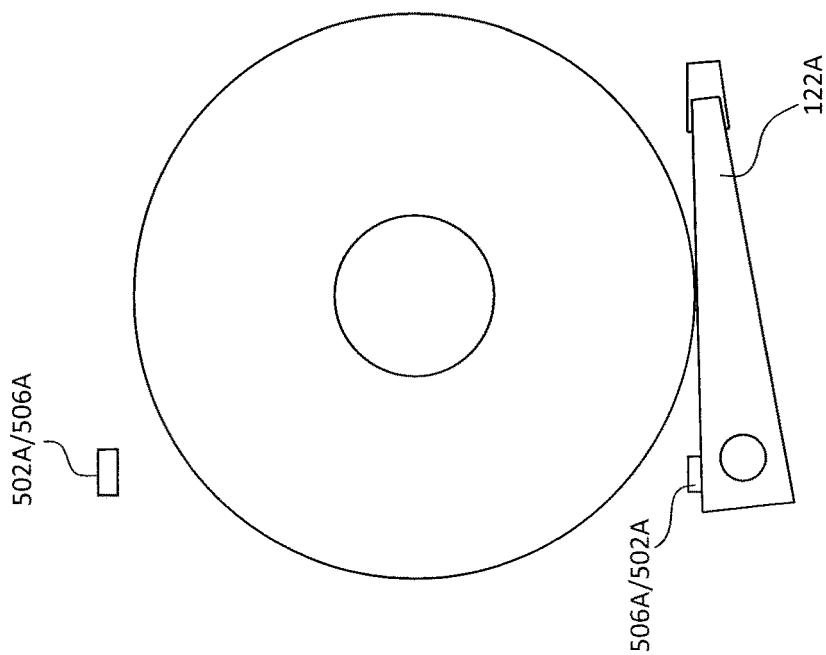

The embodiment described above in connection with FIGS. 5A and 5B has both the transmitters and the receiver(s) proximate to each other on a same portion of the device (e.g., on HSA 138). However, in alternate embodiments, either the transmitter(s) or the receiver(s) may be on (or proximate to) the movable actuation arm(s) 122A, 122B and an array of complementary devices (e.g., transmitters/receivers) may be positioned at a spaced-apart location (e.g., on an opposite side of the discs) as shown in FIGS. 5C and 5D, which are top and side views, respectively, of a data storage device portion. In one embodiment, transmitters 502A and 502B may be coupled to actuator arms 122A and 122B, respectively, and receivers 506A-506H may be positioned on an opposite side of discs 104A-104I. In the interest of simplification support structures for the receivers 506A-506H are not shown. In an alternate embodiment, receivers 506A and 506B may be coupled to actuator arms 122A and 122B, respectively, and transmitters 502A-502H may be positioned on an opposite side of discs 104A-104I. In general, the transmitters and receivers may be positioned at any different suitable locations in different embodiments. In some embodiments, each of elements 502A-502H may be an optical source. In other embodiments, elements 502A-502H may not each be optical sources. For example, a separate single optical source (not shown) or two optical sources (each providing a different optical frequency signal) (not shown) may provide optical signals to, some or all of elements 502A-506H via optical fibers. Alternatively, elements 502A-502H may be mirrors that reflect signals from the separate optical source(s) or light pipes such as optical fibers.

In the embodiment of FIGS. 5C and 5D, coarse and fine positioning of an HSA including actuator arms 122A and 122B along shaft 126 may be carried out in any suitable manner. For example, to carry out coarse positioning (e.g., to bring actuator arms 122A and 122B from the bottom of shaft 126 to disc 104F as shown in FIG. 5D) the HSA including the actuators 122A and 122B may simply be moved using a count of 4 discs in an upward direction. Once the actuator arms 122A and 122B are coarsely positioned at disc 104F, and if actuator arm 122A includes attached receiver 506A and actuator arm 122B includes attached receiver 122B, fine movement of the HSA including the actuator arms 122A and 122B along shaft 126 may take place until signals sent from transmitters 502E and 502F are received by receivers 506A and 506B, respectively. The movement of the HSA along the shaft 126 may be stopped when the respective received signals or combination of signals are at or above a predetermined strength. A controller such a 512 of FIG. 5B may be employed to direct or control certain aspects the coarse or fine positioning operations. Any suitable mechanism may be utilized to hold the HSA in position along shaft 126 once the fine positioning is completed.

Since a goal of the embodiment of FIGS. 5C and 5D is to properly receive a transmitted signal, reflection of transmitted signals from the discs should be substantially minimized. In the example provided above for positioning the HSA at disc 104F, a transmitted signal from transmitter 502E should not be substantially reflected by surfaces of discs 104E and 104F in order to properly reach receiver 506A. Similarly, a transmitted signal from transmitter 502F should not be substantially reflected by surfaces of discs 104F and 104G in order to properly reach receiver 506B. Thus, in some embodiments, the transmitted signal frequencies may be selected such that they are absorbed by the discs.

Figure 5E:
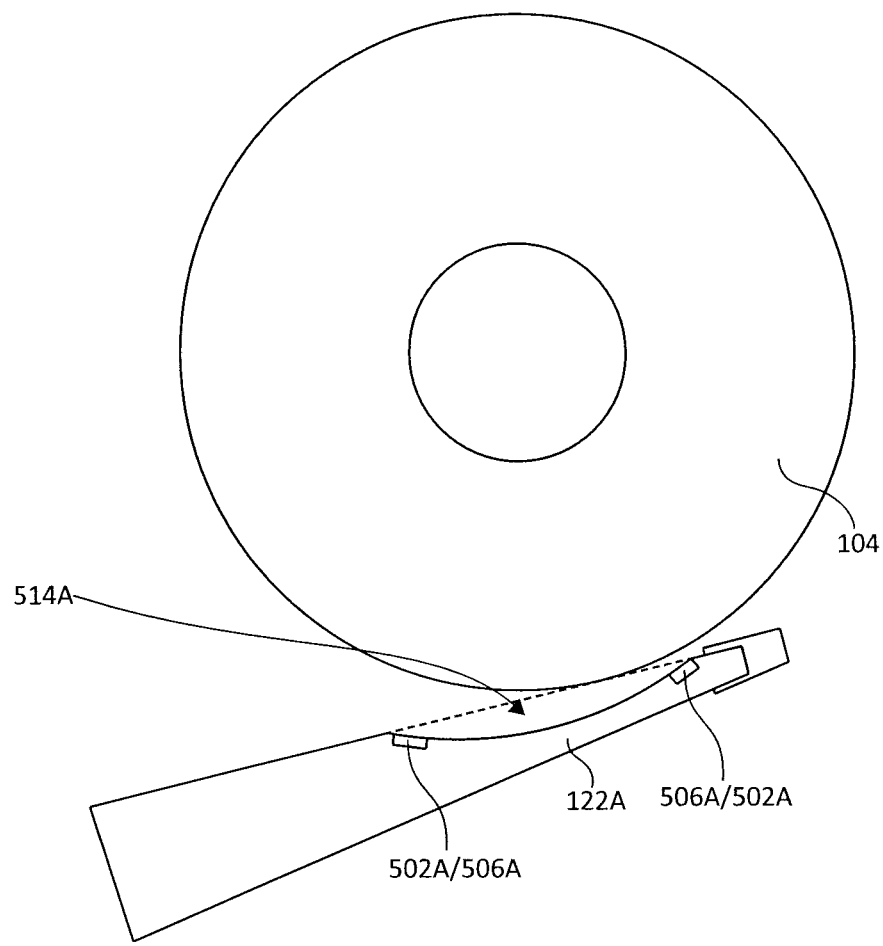
Figure 5F:
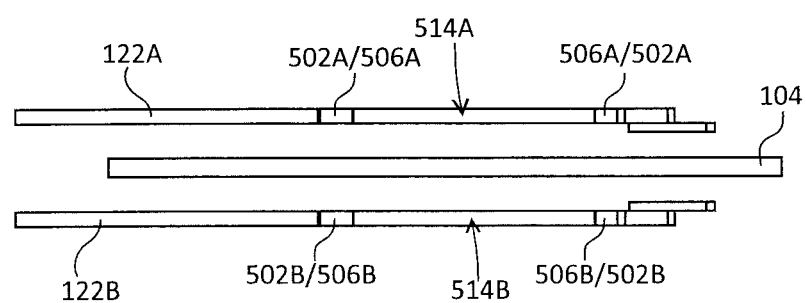

FIGS. 5E and 5F are top and side views, respectively, of a data storage device portion in which complementary devices (e.g., transmitters/receivers) are positioned at (or proximate to) ends of curved portions of upper and lower actuator arms in accordance with one embodiment. It should be noted that the side view in FIG. 5F is from an opposite side of the disc from where the actuator arms are present. In the interest of simplification, only one disc 104 is shown in FIGS. 5E and 5F. Also, in the interest of simplification, elements such as a controller, an elevator, a spindle on which the disc 104 is mounted, and a shaft along which the actuator arms 122A and 122B are configured to move are not shown in FIGS. 5E and 5F.

Upper actuator arm 122A includes a curved portion 514A (shown in FIGS. 5E and 5F) and lower actuator arm 122B (shown in FIG. 5F) includes a curved portion 514B (shown in FIG. 5F) which is directly below curved portion 514A in FIG. 5E, and is therefore not visible in that figure. In both actuator arms 122A and 122B, a transmitter 502A, 502B may be mounted at one end of the curved portion 514A, 514B, and a receiver 506A, 506B may be mounted at the other end of the curved portion, such that each actuator arm 122A, 122B has a transmitter-receiver pair. In the vertical position of the actuator arms shown in FIG. 5F, upper actuator arm 122A is just above the disc 104 and lower actuator arm 122B is just below the disc 104. Thus, when in the position shown in FIG. 5F, the actuator arms 122A and 122B may be rotated to position the heads such the read/write operations may be carried out.

Figure 5G:
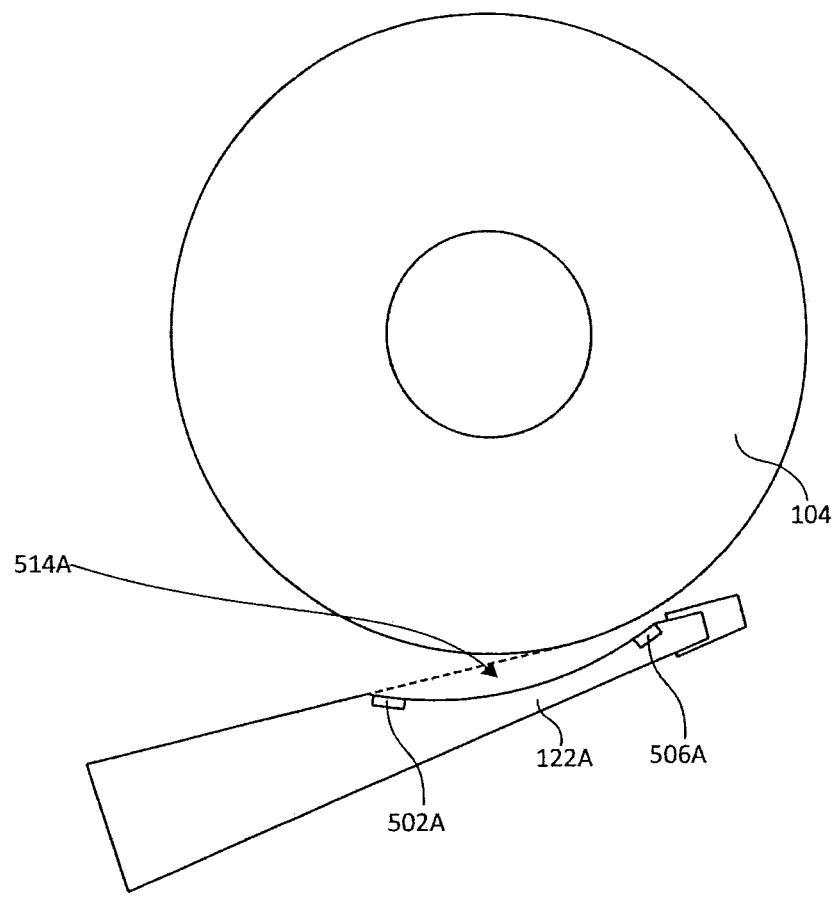
Figure 5H:
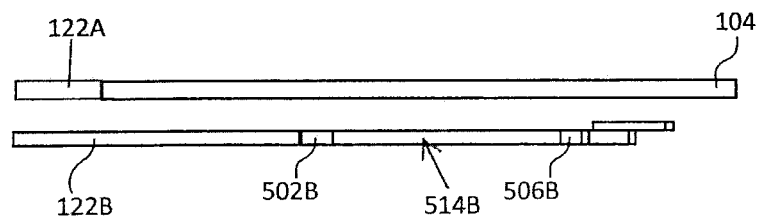

FIGS. 5G and 5H illustrate a vertical position in which the upper actuator arm 122A and the data storage medium 104 are in a same plane and when an outer edge of the data storage medium is positioned is a space formed by a curvature of the curved portion 514A. In this position, an optical signal transmitted by optical transmitter 502A is interrupted by the data storage medium 104, and is therefore not received by receiver 506A. Lack of receipt of the optical signal by the receiver 506A is indicative to the receiver 506A (or to a controller such as 512 described above) that the actuator arms 122A and 122B have to be move slightly upward to the vertical position in FIG. 5F in order for read or write operations to be carried out. The upward vertical movement may be carried out by an elevator (e.g., elevator 140, 200), and may be stopped when the optical signal transmitted by the optical transmitter 502A is no longer interrupted by the data storage medium 104, and the lower actuator arm 122B remains below the data storage medium 104.

Figure 5I:
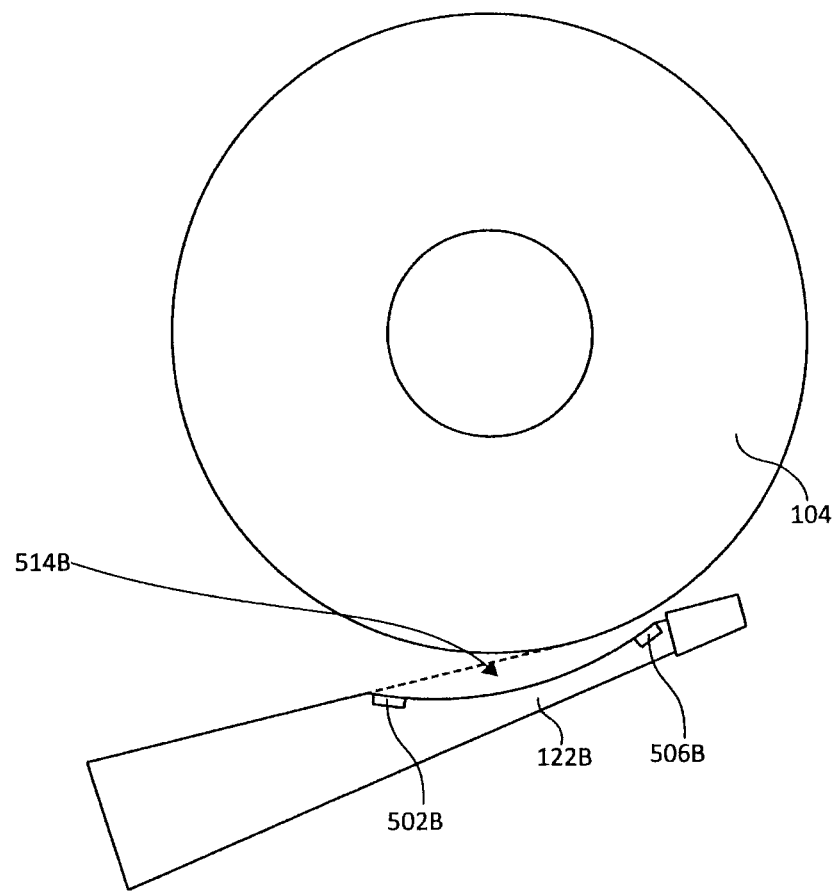
Figure 5J:
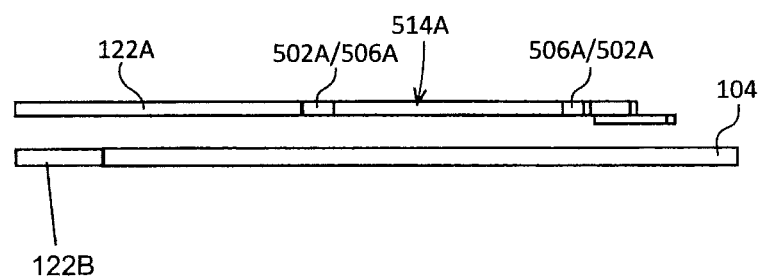

FIGS. 5I and 5J illustrate a vertical position in which the lower actuator arm 122B and the data storage medium 104 are in a same plane and when an outer edge of the data storage medium is positioned is a space formed by a curvature of the curved portion 514B. In should be noted that the upper actuator arm 122A is not shown in FIG. 5I in order for the lower actuator arm 122B to be visible. In this position, an optical signal transmitted by optical transmitter 502B is interrupted by the data storage medium 104, and is therefore not received by receiver 506B. Lack of receipt of the optical signal by the receiver 506B is indicative to the receiver 506B (or to a controller such as 512 described above) that the actuator arms 122A and 122B have to be move slightly downward to the vertical position in FIG. 5F in order for read or write operations to be carried out. The downward vertical movement may be carried out by an elevator (e.g., elevator 140, 200), and may be stopped when the optical signal transmitted by the optical transmitter 502B is no longer interrupted by the data storage medium 104, and the upper actuator arm 122A remains above the data storage medium 104.

Figure 5K:
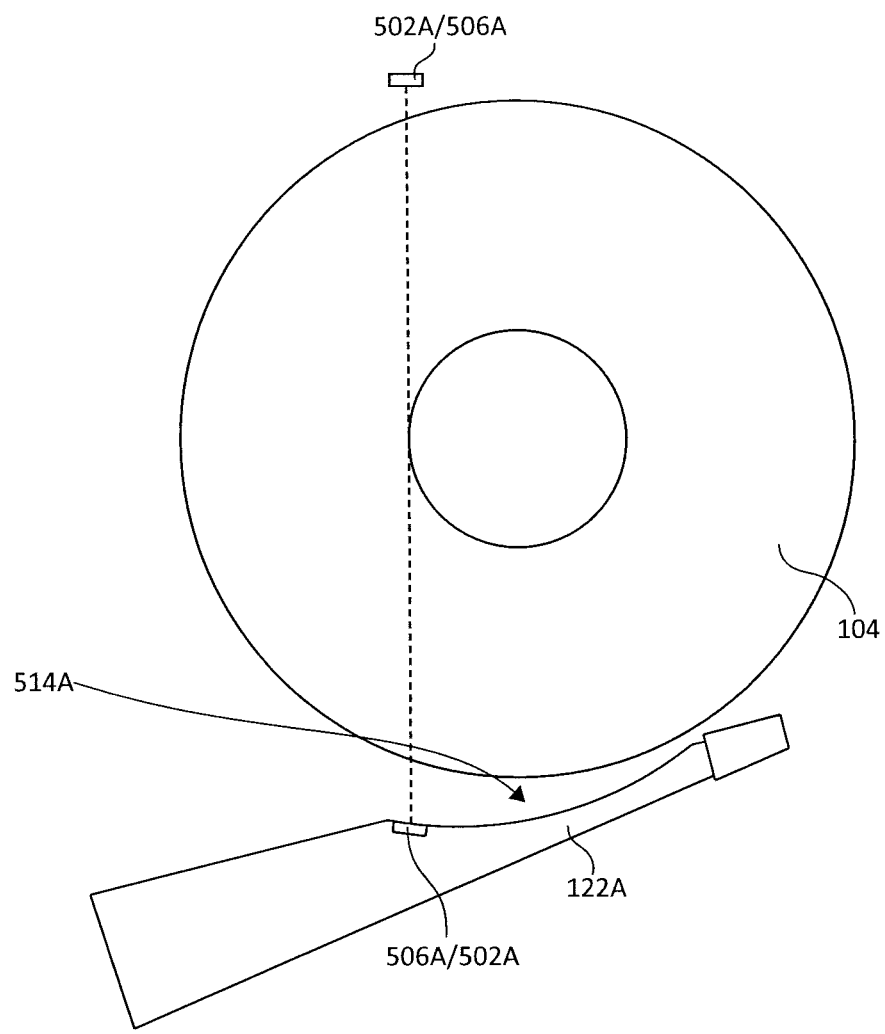
Figure 5L:
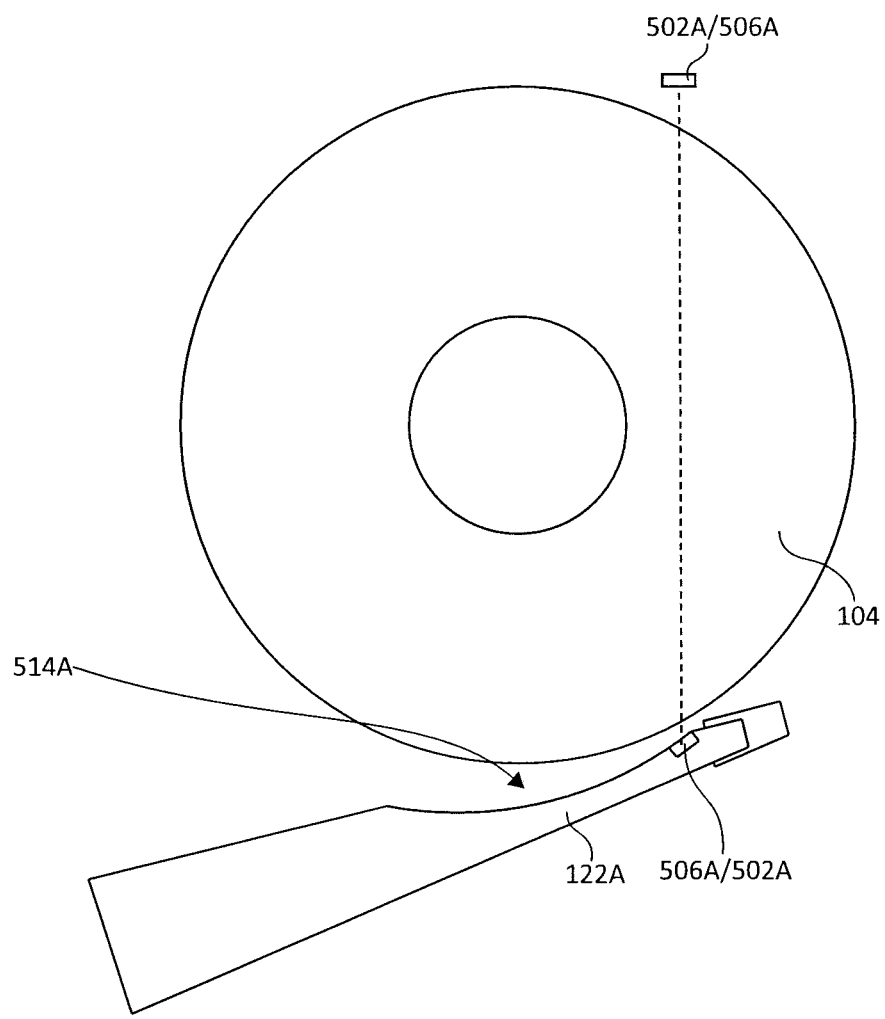

FIGS. 5K and 5L illustrate embodiments in which, instead of including a transmitter-receiver pair on the actuator arm (e.g., 122A), one device (receiver/transmitter 506A/502A) is included on the actuator arm (e.g., 122A) and the other device (transmitter/receiver 502A/506A) is included on the opposite side of the disc as in FIG. 5D. Since the embodiments of FIGS. 5K and 5L are similar to the embodiment of FIGS. 5C and 5D, which is described above, that description is generally applicable to the embodiments of FIGS. 5K and 5L.

It should be noted that, when more than one sensor (transmitter/receiver combination) that are not collocated at one end of, for example, an arm, are included, and the non-collocated sensors are at different ends, feedback for position and/or pitch and roll (in general, attitude) can be obtained.

In some implementations of the embodiments described in connection with FIGS. 5A-5L, instead of using different optical signals of different frequencies, a carrier optical signal of a particular frequency that is modulated with different modulation frequencies or amplitudes may be used to differentiate the signal of each transmitter. Also, coded signals (e.g., different optical signal codewords) may be employed to differentiate the signal of each transmitter.

In certain embodiments, a barcode encoder system employing one or more barcodes in which spacings between the bars correspond to spacings between the discs may be used for fine positioning of the HSA along shaft 126. In such embodiments, the barcode may be affixed within the data storage device in the vicinity of the discs, and the barcode may be used in lieu of the discs for identification to carry out the HSA positioning. The barcode encoder system may also be a 2-dimensional encoder that additionally includes barcode information for identifying whether heads of the HSA are off the disc(s) (e.g., on split ramp 136 of FIG. 1). This additionally provide assurance as to whether the heads are on or off the discs.

As indicated above, an intensity of reflected light may depend on the positioning of heads/actuator arms of the HSA relative to the disc stack. This property may also be used to position the HSA once the heads/actuator arms are off the disc(s). For example, the closer the heads/actuator arms of the HSA that includes an optical transmitter are to the disc or disc stack, the greater the reflection from the disc or disc stack.

The above-included description in connection with FIGS. 5A-5L relates to optical feedback/encoding systems for fine positioning of an elevator. However, in different embodiments, non-optical encoders such as magnetic encoders may instead be utilized for fine positioning of an elevator. Other examples of non-optical encoders/positioning systems include, resistance, inductive, capacitive, tactile using piezoelectric elements or limit switches or other electro mechanical systems.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
a base;
a shaft having an end coupled to the base, the shaft extending perpendicular from the base;
a head stack assembly (HSA) having an actuator arm to which a head is coupled, the head being at a first end of the HSA, and a second end of the HSA being movably mounted on the shaft;
a data storage medium with which the head is configured to interact;
an elevator configured to move the HSA along the shaft to position the HSA proximate to the data storage medium; and
an optical feedback system comprising at least one optical transmitter configured to transmit an optical signal and at least one optical receiver that is configured to detect the optical signal transmitted by the at least one optical transmitter and thereby determine a relative position between and the actuator arm and the data storage medium,
wherein the transmitted optical signal is either reflected by the data storage medium or obstructed by the data storage medium.

2. The data storage device of claim 1 and wherein at least a portion of the optical feedback system is coupled to the HSA.

3. The data storage device of claim 1 and wherein the at least one optical transmitter is a different location from the at least one optical receiver.

4. The data storage device of claim 1 and wherein the at least one optical transmitter and the at least one optical receiver are co-located.

5. The data storage device of claim 1 and wherein, when the optical signal is reflected by the data storage medium, the at least one optical receiver is configured to detect the reflected signal.

6. The data storage device of claim 1 and wherein the transmitted optical signal is reflected by a calibrated surface, and wherein the at least one optical receiver is configured to detect the reflected signal.

7. The data storage device of claim 6 and wherein the calibrated surface comprises a mirror or a bar code.

8. The data storage device of claim 1 and wherein the optical feedback system comprises an equal number of optical transmitters and receivers.

9. The data storage device of claim 1 and wherein a number of optical transmitters in the optical feedback system is different from a number of optical receivers in the optical feedback system.

10. The data storage device of claim 1 and wherein the at least one optical transmitter is positioned at an opposite side of the data storage medium than the at least one optical receiver.

11. A data storage device comprising:
a base;
a shaft having an end coupled to the base, the shaft extending perpendicular from the base;
a head stack assembly (HSA) having an upper actuator arm to which a down-facing head is coupled and a lower actuator arm to which an up-facing head is coupled, the down-facing head and the up-facing head being at a first end of the HSA, and a second end of the HSA being movably mounted on the shaft;
a data storage medium an upper surface with which the down-facing head is configured to interact and a lower surface with which the up-facing head is configured to interact;
an elevator configured to move the HSA along the shaft to position the HSA proximate to the data storage medium; and
an optical feedback system comprising at least one optical transmitter and at least one optical receiver, with at least a portion of the optical feedback system coupled to the upper actuator arm and the lower actuator arm such that optical signals transmitted by the at least one optical transmitter are detected by the at least one optical receiver when the elevator positions the upper actuator arm and the lower actuator arm at a predetermined location relative to the data storage medium, wherein the transmitted optical signals are either reflected by the data storage medium or obstructed by the data storage medium.

12. The data storage device of claim 11 and wherein the upper actuator arm comprises a first curved portion having a first end to which a first optical transmitter is coupled and a second end to which a first optical receiver is coupled, and wherein the lower actuator arm comprises a second curved portion having third end to which a second optical transmitter is coupled and a fourth end to which a second optical receiver is coupled.

13. The data storage device of claim 12 and wherein an optical signal transmitted by the first optical transmitter is interrupted by the data storage medium when the upper actuator arm and the data storage medium are in a same plane and when an outer edge of the data storage medium is positioned is a space formed by a curvature of the first curved portion, and wherein the elevator is configured to move the HSA along the shaft in an upward direction until the optical signal transmitted by the first optical transmitter is no longer interrupted by the data storage medium, and the lower actuator arm remains below the data storage medium.

14. The data storage device of claim 12 and wherein an optical signal transmitted by the second optical transmitter is interrupted by the data storage medium when the lower actuator arm and the data storage medium are in a same plane and when an outer edge of the data storage medium is positioned is a space formed by a curvature of the second curved portion, and wherein the elevator is configured to move the HSA along the shaft in a downward direction until the optical signal transmitted by the second optical transmitter is no longer interrupted by the data storage medium, and the upper actuator arm remains above the data storage medium.

15. The data storage device of claim 11 and wherein the at least one optical transmitter is positioned at an opposite side of the data storage medium than the at least one optical receiver.

\* \* \* \* \*